US009790338B2

(12) United States Patent
Kaminaga et al.

(10) Patent No.: US 9,790,338 B2
(45) Date of Patent: Oct. 17, 2017

(54) ION EXCHANGE MEMBRANE AND METHOD FOR MANUFACTURING THE SAME

(71) Applicant: FUJIFILM Corporation, Tokyo (JP)

(72) Inventors: Kuniyuki Kaminaga, Kanagawa (JP); Tetsufumi Takamoto, Kanagawa (JP); Keisuke Kodama, Kanagawa (JP); Kazuomi Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/248,541

(22) Filed: Aug. 26, 2016

(65) Prior Publication Data
US 2016/0362526 A1 Dec. 15, 2016

Related U.S. Application Data

(63) Continuation of application No. PCT/JP2015/055271, filed on Feb. 24, 2015.

(30) Foreign Application Priority Data

Feb. 28, 2014 (JP) .................................. 2014-039931

(51) Int. Cl.
C08J 5/22 (2006.01)
B01J 41/14 (2006.01)
B01J 47/12 (2017.01)
B01D 71/82 (2006.01)
B01D 61/48 (2006.01)

(52) U.S. Cl.
CPC ............ C08J 5/2243 (2013.01); B01D 71/82 (2013.01); B01J 41/14 (2013.01); B01J 47/12 (2013.01); C08J 5/2231 (2013.01); B01D 61/48 (2013.01); C08J 2325/18 (2013.01); C08J 2333/24 (2013.01); C08J 2333/26 (2013.01)

(58) Field of Classification Search
CPC .... C08J 5/2243; C08J 5/2231; C08J 2325/18; C08J 2333/26; C08J 2333/24; B01J 41/14; B01J 47/12; B01D 71/82; B01D 61/48

USPC .......................................................... 521/27
See application file for complete search history.

(56) References Cited

U.S. PATENT DOCUMENTS

| 4,275,227 | A | 6/1981 | MacDonald | |
| 9,309,343 | B2* | 4/2016 | Van Berchum | .... B01D 67/0006 |
| 2015/0353721 | A1* | 12/2015 | Takamoto | ................ C09D 4/00 442/59 |

FOREIGN PATENT DOCUMENTS

| EP | 2 957 588 A1 | 12/2015 | |
| EP | 3 040 365 A1 | 7/2016 | |
| JP | 56-68647 A | 6/1981 | |
| JP | 2005-158724 A | 6/2005 | |
| JP | 2014-171952 A | 9/2014 | |
| JP | EP 2957588 A1 * | 12/2015 | .......... C08F 222/385 |
| JP | EP 3040365 A1 * | 7/2016 | ............ C08F 212/14 |
| NL | WO 2013011273 A1 * | 1/2013 | ......... B01D 67/0006 |
| WO | 2009/145188 A1 | 12/2009 | |
| WO | 2013/011272 A1 | 1/2013 | |
| WO | 2013/011273 A1 | 1/2013 | |
| WO | 2015/030071 A1 | 3/2015 | |

OTHER PUBLICATIONS

International Search Report for PCT/JP2015/055271 dated May 26, 2015.
Communication dated Feb. 15, 2017 from the European Patent Office in counterpart Application No. 15755429.6.

* cited by examiner

Primary Examiner — Michael M Bernshteyn
(74) Attorney, Agent, or Firm — Sughrue Mion, PLLC

(57) ABSTRACT

An ion exchange membrane obtained by using an ionic monomer having at least two or more polymerizable functional groups, in which a hydrophobicity index H obtained by an expression below from a monomer for forming an ion exchange resin and a material fixed to the resin in the ion exchange membrane is 1.6 or greater, and a manufacturing method therefor. Hydrophobicity index $H=\Sigma\{(\log P$ of each component$)\times($molar ratio of each material in resin$)\}$.

12 Claims, 1 Drawing Sheet

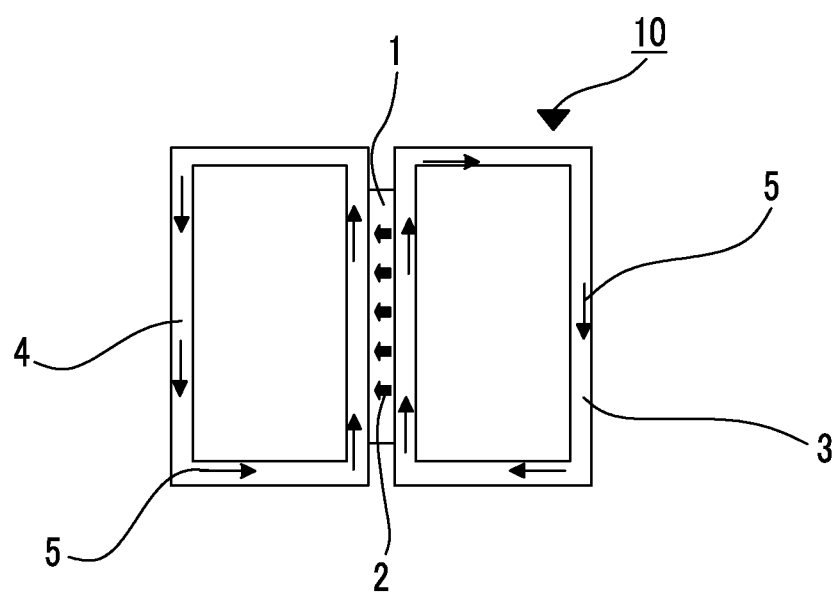

US 9,790,338 B2

ION EXCHANGE MEMBRANE AND METHOD FOR MANUFACTURING THE SAME

CROSS-REFERENCE TO RELATED APPLICATIONS

This application is a Continuation of PCT International Application No. PCT/JP2015/055271 filed on Feb. 24, 2015, which claims priority under 35 U.S.C. §119 (a) to Japanese Patent Application No. 2014039931 filed in Japan on Feb. 28, 2014. Each of the above applications is hereby expressly incorporated by reference, in its entirety, into the present application.

BACKGROUND OF THE INVENTION

1. Field of the Invention

The present invention relates to an ion exchange membrane and a method for manufacturing the same.

2. Description of the Related Art

Ion exchange membranes are used in electrodeionization (EDI), continuous electrodeionization (CEDI), electrodialysis (ED), and electrodialysis reversal (EDR). Ion exchange membranes are used not only in general usage but also in medical use, and recently ion exchange membranes have also been used in a solid polymer electrolyte-type fuel cell.

Electrodeionization (EDI) is a water treatment process for removing ions from aqueous liquids by using an ion exchange membrane and an electrical potential in order to achieve ion transport. EDI differs from other water purification technologies, such as conventional ion exchange, in that it is does not require the use of chemicals such as acids or caustic soda, and can be used to produce ultra pure water. Electrodialysis (ED) and electrodialysis reversal (EDR) are electrochemical separation processes for removing ions and the like from water and other fluids.

An anion exchange membrane having a cationic group such as quaternary ammonium and a cation exchange membrane having an anionic group such as a sulthnic acid salt mainly in a polymer may be provided in an ion exchange membrane, and research on improvement in both is actively being conducted (for example, see WO2013/011272A, WO2013/011273A, WO2009/145188A, and JP2005-158724A).

SUMMARY OF THE INVENTION

An ion exchange membrane (hereinafter, simply referred to as a "membrane") has low electrical resistance in a membrane and it is important to cause water permeability to be low. However, if the ion exchange capacity is increased by increasing the charge density in the ion exchange polymer in order to cause the electrical resistance of the membrane to be low, the moisture content of the membrane increases, and accordingly the water permeability increases. Meanwhile, if the crosslinking density is increased by increasing a blending proportion of a crosslinking agent in order to decrease the water permeability, the electrical resistance of the membrane increases.

It is possible to control the electrical resistance and the water permeability by changing the membrane thickness without changing an ion exchange polymer. However, if the membrane thickness is caused to be thin, the electrical resistance decreases, and the water permeability increases. On the other hand, if the membrane thickness is increased, the water permeability decreases, and the electrical resistance increases.

In this manner, since the electrical resistance of a membrane and the water permeability have a tradeoff relationship, it is difficult to obtain both of low electrical resistance and low water permeability.

The present inventors have considered the water permeability and the electrical resistance of a membrane as a whole, and have conducted research for decreasing the values with this balance overall, that is, decreasing the product of the water permeability and the electrical resistance of the membrane. Accordingly, for example, a decrease in the energy required for electrodialysis can be expected.

If compositions for forming an ion exchange polymer are the same, the electrical resistance of a membrane and the water permeability can be controlled by controlling the membrane thickness or the like, while the value of the product of the water permeability and the electrical resistance of the membrane is maintained. Therefore, the present inventors consider that the value of the product of the water permeability and the electrical resistance of a membrane as described above is particularly important as an index indicating compatibility between low electrical resistance and low water permeability.

Accordingly, an object of this invention is for providing an ion exchange membrane having a low product of electrical resistance and water permeability with respect to an ion exchange membrane having high charge density, high ion exchange capacity, and high crosslinking density and a method for manufacturing the same.

In an ion exchange resin for forming an ion exchange membrane, the present inventors reviewed various crosslinking agents, that is, various combinations of a monomer having two or more polymerizable functional groups and a monomer having one polymerizable functional group, and as a result, found that problems were able to be solved by using a crosslinking agent having an ionic functional group in a crosslinking agent so as to increase the hydrophobicity of the ion exchange resin to reach a specific standard or higher, such that the invention has been realized.

Accordingly, the problems are solved by the following means.

<1> An ion exchange membrane obtained by using an ionic monomer having at least two or more polymerizable functional groups, in which a hydrophobicity index H obtained by an expression below from a monomer for forming an ion exchange resin in the ion exchange membrane and a material fixed to the resin is 1.6 or greater.

Hydrophobicity index $H=\Sigma\{(\log P \text{ of each component})\times(\text{molar ratio of each material in resin})\}$ <2> The ion exchange membrane according to <1>, in which the ionic monomer includes quaternary ammonium.

<3> The ion exchange membrane according to <1>, in which the ionic monomer includes a sulfonic acid group or a salt thereof.

<4> The ion exchange membrane according to any one of <1> to <3>, in which the ionic monomer includes an alkyl amide group as the polymerizable functional group.

<5> The ion exchange membrane according to any one of <1> to <3>, in which the ionic monomer includes a styrene structure as the polymerizable functional group.

<6> The ion exchange membrane according to any one of <1> to <5> obtained by optically polymerizing and curing the ionic monomer.

<7> The ion exchange membrane according to any one of <1> to <5> obtained by thermally polymerizing and curing the ionic monomer.

<8> The ion exchange membrane according to any one of <1> to <7>, obtained by polymerizing and curing a composition, in which a moisture content of the composition including the ionic monomer is 35 mass % or less.

<9> A method for manufacturing an ion exchange membrane, by using an ionic monomer having at least two or more polymerizable functional groups, comprising: polymerizing and curing a monomer for forming an ion exchange resin in the ion exchange membrane and a material fixed to the resin such that a hydrophobicity index H obtained by an expression below is 1.6 or greater.

Hydrophobicity index $H=\Sigma\{(\log P \text{ of each component})\times(\text{molar ratio of each material in resin})\}$ <10> The method for manufacturing an ion exchange membrane according to <9>, comprising: optically polymerizing and curing the ionic monomer.

<11> The method for manufacturing an ion exchange membrane according to <9>, comprising: thermally polymerizing and curing the ionic monomer.

<12> The method for manufacturing an ion exchange membrane according to any one of <9> to <11>, comprising: polymerizing and curing a composition, in which a moisture content of the composition including the ionic monomer is 35 mass % or less.

In this specification, the expression "to" is used to have a meaning of including numerical values indicated before and after the expression "to" as a lower limit and an upper limit.

Unless described otherwise, in respective general formulae, in the case where there are plural groups indicated by the same reference numerals, the groups may be identical to or different from each other. In the case where there are plural repetitions of partial structures, the repetitions may be both of identical repetitions or a mixture of different repetitions in the defined range.

Unless described otherwise, respective groups may have substituents, and examples of substituents include the substituent group α described below. This is also the same for compounds for which substitution or non-substitution is not specified.

Unless otherwise described, a geometric isomer which is a substitution form of a double bond in respective general formulae may be an E isomer or a Z isomer, or a mixture thereof, even if one side of the isomer is described, for the convenience of the indication.

According to the invention, the expression "acryl" includes a group in which not only a methyl group is substituted, but also an alkyl group is substituted at an α position in an acyl group such as acryl or methacryl, and is used as an expression collectively referring to acids thereof, salts thereof, esters thereof, or amides thereof. That is, the expression "acryl" includes acrylic acid esters, amides, or acrylic acids or salts thereof, α-alkyl substituted acrylic acid esters, amides, α-alkyl substituted acrylic acids, or salts thereof, or both of them.

According to the invention, it is possible to provide an ion exchange membrane having a value of a low product of electrical resistance and water permeability with respect to an ion exchange membrane having high charge density, high ion exchange capacity, and high crosslinking density and a method for manufacturing the same.

BRIEF DESCRIPTION ON THE DRAWINGS

FIG. 1 is a diagram schematically illustrating a flow channel of a device for measuring water permeability of a membrane.

DESCRIPTION OF THE PREFERRED EMBODIMENTS

<<Ion Exchange Membrane>>

The ion exchange membrane according to the invention is an ion exchange membrane that can be obtained by using an ionic monomer having at least two or more polymerizable functional groups, that is, a crosslinking agent having ionic groups, and an ion exchange resin in an ion exchange membrane has a specific hydrophobicity index.

<Hydrophobicity Index>

The hydrophobicity index according to the invention is a hydrophobicity index H that is obtained by an expression below from a monomer for forming an ion exchange resin and a material fixed to the resin, and the value thereof is 1.6 or greater.

Hydrophobicity index $H=\Sigma\{(\log P \text{ of each component})\times(\text{molar ratio of each material in resin})\}$ Here, the monomer forming the ion exchange resin refers to a unit forming a polymer of the ion exchange resin or a monomer of a raw material of the repeating unit, and the material fixed to the resin refers to a material that is bonded to any portion in the polymer of the resin via a covalent bond or that is not discharged even if the obtained resin is washed with neutral, acidic, or alkaline water.

The material that is not fixed to the resin is a composition including an ionic monomer, a solvent that is included or may be included in the coating liquid (for example, water and an organic solvent), inorganic salt or inorganic ion species. Examples thereof also include organic ion species or water soluble organic salt that is not bonded to the polymer via the covalent bond in the polymerizing and curing reaction.

Meanwhile, examples of the material fixed to the resin include not only a monomer having a polymerizable group but also a polymerization initiator and polymerization inhibitor. In the the polymerization initiator, radical species are generated in at the time of polymerizing and curing reaction and can be partially bonded to the polymer, and the polymerization inhibitor have the same possibility. Therefore, the invention includes the the polymerization initiator and the polymerization inhibitor.

As indicated the expression above, the hydrophobicity index H is obtained by multiplying log P and the molar ratio of each component in the resin and each material and calculating the sum thereof.

Here, log P is an octanol-water distribution coefficient, and used in the evaluation of the hydrophobicity and the hydrophilicity. As the specific measuring method, log P can be measured by using a shake flask method disclosed in Z 7260-107 (2000) of Japanese Industrial Standard (JIS). The octanol-water distribution coefficient (log P) can be estimated by a calculating chemical method or an empirical method, instead of the measuring method as above. As the calculation method, a Crippen's fragmentation method [J. Chem. Inf. Comput. Sci., 27, 21 (1987)], a Viswanadhan's fragmentation method [J. Chem. Inf. Comput. Sci., 29, 163 (1989)], a Broto's fragmentation method [Eur. J. Med. Chem. -Chin. Theor., 19, 71 (1984)], and the like are preferably used, but a Crippen's fragmentation method [J. Chem. Inf. Comput. Sci., 27, 21 (1987))] is more preferable.

In the case where log P of the target compound varies according to the measuring method or the calculation method, it is preferable to determine whether the compound in the range of the invention by the Crippen's fragmentation method which is the calculation method.

The value of the log P applied to the invention employs the value obtained by performing the calculation based on Crippen's fragmentation: J. Chem. Inf. Comput. Sci., 27, 21 (1987) attached to Chem Draw Pro ver. 12.0 manufactured by PerkinElmer Inc., which can perform calculation by an input of a structural formula of the compound.

However, log P based on Crippen's fragmentation cannot be calculated from the structure of salt. Therefore, the calculation is performed with a compound in which the salt portion is converted to a nonionic structure which is not salt. According to the invention, as described below, hydrophobicity is important in the structure other than the ionic portion. It is considered that water existing near the structure other than the ionic portion such as salt greatly gives influence on the compatibility between the water permeability and the electrical resistance of the membrane in the ion exchange membrane. Therefore, according to the calculation as below, it is considered that it is possible to obtain a more favorable value as a value indicating hydrophilicity and hydrophobicity that give influence on the compatibility between the water permeability and the electrical resistance of the membrane in the ion exchange membrane.

(Structure Conversion of Compound having Ionic Group of Salt)

The method for converting the salt portion to a nonionic structure which is not salt is performed in two methods below.

(a) Counter ion is substituted with hydrogen atom

In the case of inorganic salt such as —SO$_3$Na and —CO$_2$K, the inorganic salt is substituted with —SO$_3$H or —CO$_2$H. In the same manner, in the case of organic salt, for example, in —SO$_3$⁻N⁺(CH$_3$)$_4$, only —SO$_3$H is calculated.

(b) In the case of having quaternary ammonium group in monomer having polymerizable functional group, one substituent having least molecular weight which is bonded to a nitrogen atom is removed.

In this case, the condition is that, in the case where a portion forming a main chain of the polymer is remained and a substituent of a nitrogen atom is removed in the state in which the polymer is formed, the main chain of the polymer is not cut.

That is, accordingly, a tertiary amine compound is obtained by removing the substituent that is bonded to nitrogen, such that the decrease of the molecular weight of the monomer becomes the minimum.

However, in the case where a ring structure is formed such as pyridinium, the substituent itself is not removed, a bond is cut and a hydrogen atom in a portion required by the cutting is applied.

Here, in the case where structure conversion is considered to be performed plural times, a value in which the continued calculation value of log P becomes the minimum is employed.

Specific examples of the structure conversion are presented below.

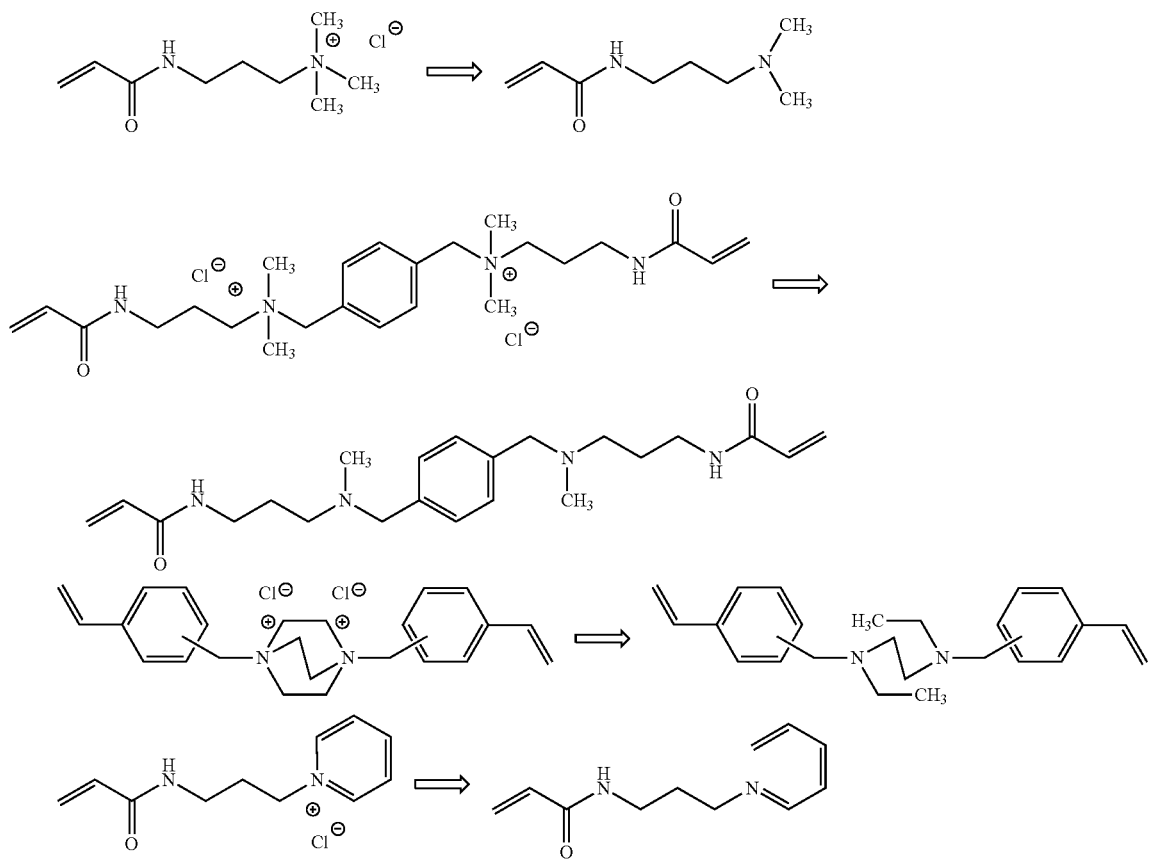

In the calculation of the hydrophobicity index H above, the molar ratio of each material in the resin is calculated as a monomer structure used for forming the polymer and a structure of a compound added to the composition itself (ion exchange membrane forming composition) including the ionic monomer, if the compound is not a repeating unit of a polymer such as a polymerization initiator or a polymerization inhibitor.

In the case where the ion exchange membrane is hydrophobized, the water permeability decreases according to the decrease of the moisture amount of the membrane, and also the electrical resistance of the membrane increases. The tradeoff relationship between the water permeability and the electrical resistance of the membrane cannot be broken. It is considered that the increase of the electrical resistance of the membrane is caused by the reduction of the number of paths through which ions can permeate, due to the decrease of the moisture amount of the membrane, since the permeating ions permeate the membrane in a hydration state. Here, if an area in which water exists in the ion exchange membrane is considered, the area can be divided into an edge portion of the ionic functional group and a neutral portion for forming a main chain or a side chain of the other polymers. If the water existing in these areas and the influence on the water permeability and the electrical resistance which are ion exchange membrane performances are considered, since water existing in the both areas gives influence on the water permeability. However, since the ions permeate the former area, the water existing in the former area gives influence on the electrical resistance but the water existing in the former area gives less influence. The hydrophobization according to the invention is a method for decreasing the amount of the water existing in the latter area by designing the membrane by calculation from the structure excluding the ionic functional group. According to this method, the tradeoff between the water permeability and the electrical resistance can be broken.

The hydrophobicity index H is 1.6 or greater, but preferably 1.6 to 6.0, more preferably 1.6 to 5.6, even more preferably 1.65 to 5.6, and particularly preferably 1.7 to 5.6.

The hydrophobicity index H can be in the range described above, according to the type of the used monomer structure, a combination ratio of a monomer having one polymerizable functional group and a monomer having two or more polymerizable functional groups, which is a crosslinking agent, and types of a polymerization initiator and a polymerization inhibitor.

<Crosslinking Agent>

The crosslinking agent is a monomer having at least two or more polymerizable functional groups. Here, the polymerizable functional group is a functional group in a portion at which the polymerization reaction is performed. The polymerization reaction may be any methods such as polymerization by light or heat, polymerization by radical or ion reaction, addition polymerization, polycondensation, and addition condensation. According to the invention, radical polymerization by light or heat and ion polymerization are preferable, and radical polymerization by light or heat is more preferable.

Examples of the reaction portion at which the polymerization reaction is performed include an active cyclic ether group such as an ethylenically unsaturated group, an epoxy group, or oxetane group. According to the invention, an ethylenically unsaturated group is preferable.

in the ethylenically unsaturated group, an acryloyl group such as alkyl ester, methacryl ester, alkyl amide, methacryl amide [—C(=O)CH=CH$_2$, —C(=O)C(CH$_3$)=CH$_2$] or a vinyl group such as styrene is preferable.

Even more preferably, an alkylamide group, a methacrylamide group (in this specification, these are collectively referred to as an alkylamide group), and a vinyl group having a styrene structure are preferable.

According to the invention, as the crosslinking agent, an ionic monomer having at least two or more polymerizable functional groups and ionic functional groups is used.

Here, ionicity means a function of being dissociated in ions to form a salt structure, and the ions may be cations or anions.

Examples of the cationic functional group in the ionic functional group include an onio group such as quaternary ammonium, pyridinium, and sulfonium, and a group including quaternary ammonium is preferable. The quaternary ammonium may have a chain shape or a cyclic shape.

As the anionic functional group, a sulfonic acid group (hereinafter, also referred to as sulfo group) or salts thereof, a carboxylic acid group (carboxy group) or salts thereof, a phosphate group or salts thereof, and a sulfonic acid group (sulfo group) or salts thereof are preferable.

The number of ionic functional groups included in the crosslinking agent used in the invention is preferably 1 to 4, more preferably 2 to 4, even more preferably 2 or 3, and particularly preferably 2.

The number of polymerizable functional groups included in the crosslinking agent is preferably 2 to 4, more preferably 2 or 3, and particularly preferably 2.

In the case where the ionic monomer having at least two or more polymerizable functional groups according to the invention is a cationic monomer, the ionic monomer is preferably a monomer expressed by any one of General formulae (CCL-A) to (CCL-C) below.

General Formula (CCL-A)

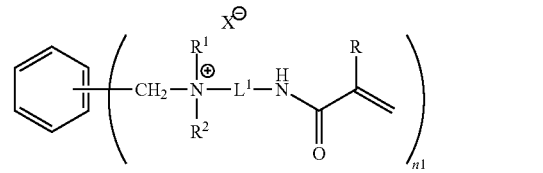

General Formula (CCL-B)

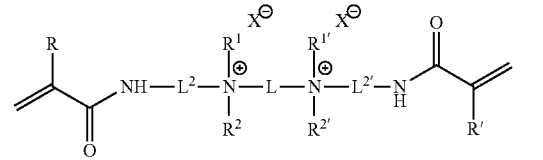

General Formula (CCL-C)

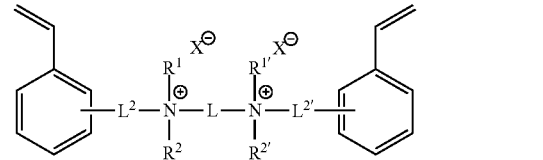

In General formulae (CCL-A) to (CCL-C), each of R and R' independently represents a hydrogen atom or an alkyl group, and each of $R^1$, $R^{1'}$, $R^2$, and $R^{2'}$ independently represents an alkyl group or an aryl group. Each of L, $L^1$, $L^2$, and $L^{2'}$ independently represents an alkylene group, an arylene group, or a bivalent linking group obtained by combining these. Here, at least two of $R^1$, $R^{1\prime}$, $R^2$, and $R^{2\prime}$ may be bonded to each other to form a ring, together with L. X represents a counter anion. n1 represents an integer of 2 to 6.

These groups may be further substituted with a substituent, and examples of the substituent include the substituent group α described below.

The number of the alkyl group in R and R' is preferably 1 to 3, more preferably 1 or 2, and even more preferably 1. Examples of the alkyl group include methyl, ethyl, propyl, and isopropyl, and a methyl group is preferable.

R and R' are preferably hydrogen atoms.

The number of carbon atoms of the alkyl group in $R^1$, $R^{1\prime}$, $R^2$, and $R^{2\prime}$ is preferably 1 to 3, more preferably 1 or 2, and even more preferably 1. Examples of the alkyl group include methyl, ethyl, propyl, and isopropyl, and a methyl group is preferable.

The number of carbon atoms of the aryl group in $R^1$, $R^{1\prime}$, $R^2$, and $R^{2\prime}$ is preferably 6 to 10, more preferably 6 or 8, and even more preferably 6. Examples of the aryl group include phenyl and naphthyl groups, and a phenyl group is preferable.

A ring formed by bonding at least two of $R^1$, $R^{1\prime}$, $R^2$, and $R^{2\prime}$ together with L is preferably a 5-membered or 6-membered ring, and may be a crosslinked polycyclic ring.

Examples of this ring include a piperazine ring, and a 1,4-diazabicyclo[2,2,2]octane ring.

The number of carbon atoms of the alkylene group in L, $L^1$, $L^2$, and $L^{2\prime}$ is preferably 1 to 10 and more preferably 1 to 6. The number of carbon atoms of the alkylene group in $L^1$, $L^2$, and $L^{2\prime}$ is further preferably 1 to 4 and particularly preferably 1 to 3.

The number of carbon atoms of the arylene group in L, $L^1$, $L^2$, and $L^{2\prime}$ is preferably 6 to 10 and more preferably 6 to 8. The arylene group includes phenylene and naphthylene and phenylene is preferable.

Examples of the group obtained by combining an alkylene group and an arylene group include an alkylene-arylene group and an alkylene-arylene-alkylene group.

L, $L^1$, $L^2$, and $L^{2\prime}$ are preferably alkylene groups.

Examples of the counter anion in X include a halogen ion, and an organic or inorganic sulfonic acid ion. Among these, a halogen ion is preferable, and a chlorine ion and a bromine ion are preferable.

n1 represents an integer of 2 to 6, preferably 2 or 3, and more preferably 2.

Specific examples of the monomer expressed by any one of General formulae (CCL-A) to (CCL-C) are provided below, but the invention is not limited thereto.

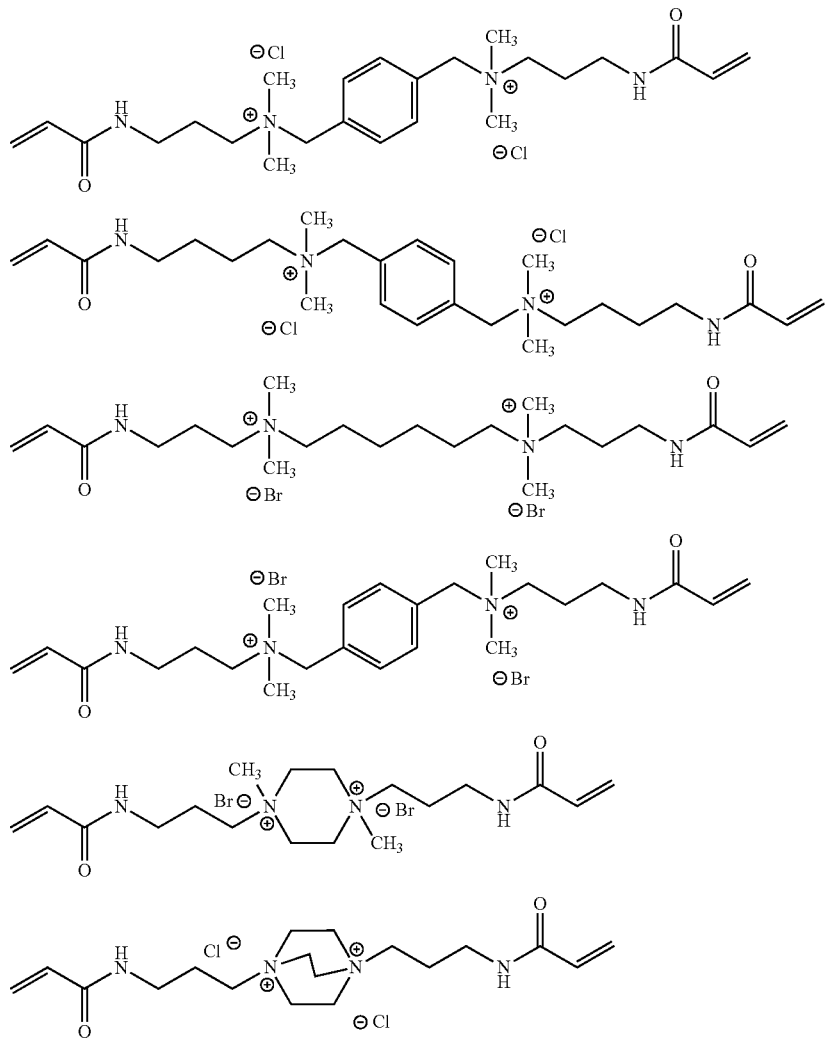

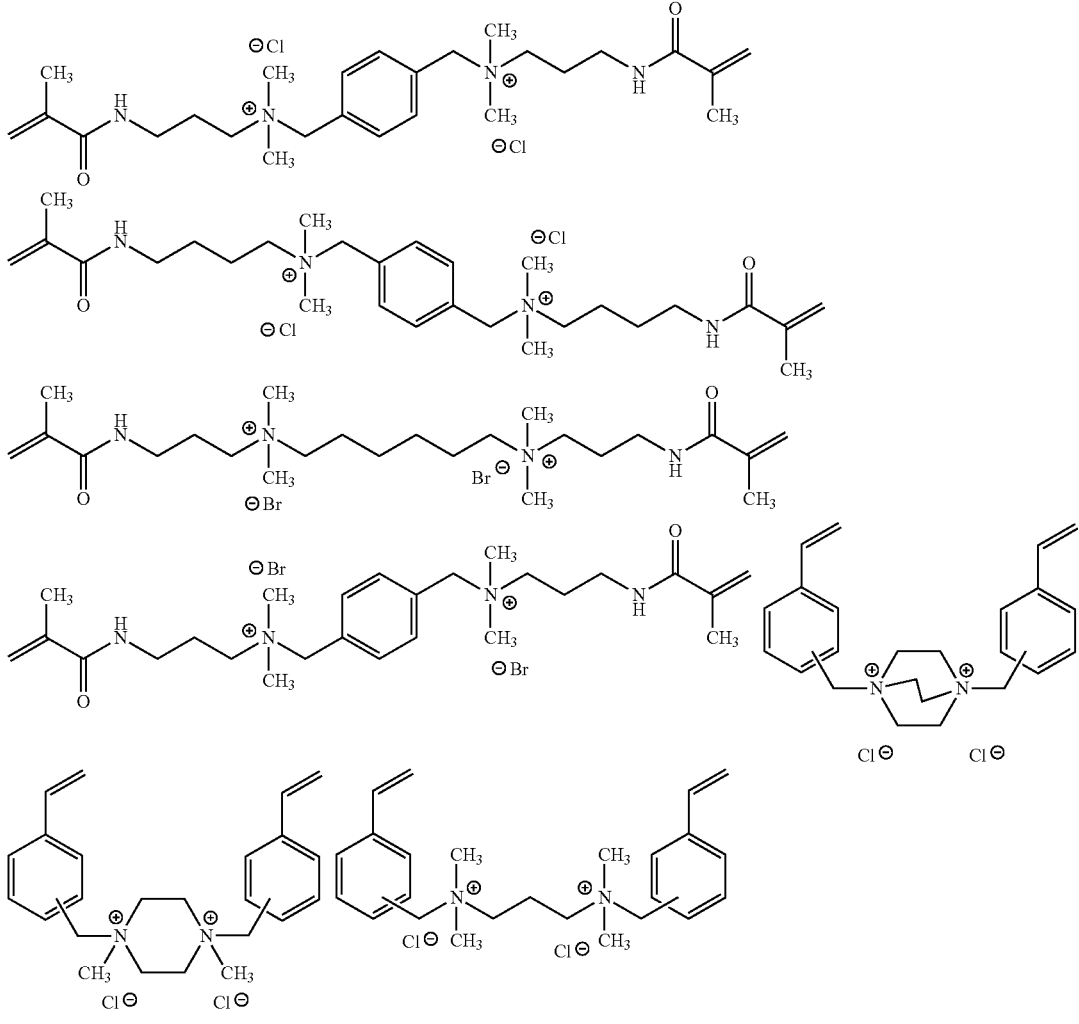

In the case where an ionic monomer having at least two or more polymerizable functional groups according to the invention is an anionic monomer, the ionic monomer is preferably a monomer expressed by any one of General formulae (ACL-A) to (ACL-C) below.

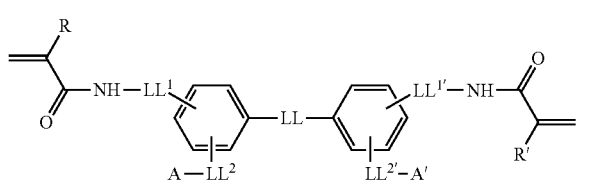

General Formula (ACL-A)

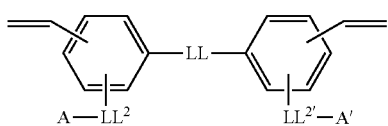

General Formula (ACL-B)

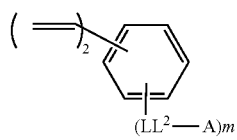

General Formula (ACL-C)

In General formulae (ACL-A) to (ACL-C), each of R and R' independently represents a hydrogen atom or an alkyl group, LL represents a single bond or a bivalent linking group. Each of $LL^1$, $LL^{1'}$, $LL^2$, and $LL^{2'}$ independently represents a single bond or a bivalent linking group, and each of A and A' independently represents a sulfo group or the salts thereof. m represents 1 or 2.

These groups may be further substituted with substituents, and examples of he substituent include the substituent group α described below.

R and R' have the same meaning as R and R' in General formulae (CCL-A) to (CCL-C), and preferable ranges thereof are also the same.

The salt of the sulfo group in A and A' is preferably salt of alkali metal, more preferably sodium salt or potassium salt, and even more preferably sodium salt.

m is preferably 1.

The bivalent linking group in LL is preferably an alkylene group, an alkenylene group, an alkynylene group, or an arylene group, and more preferably an alkylene group or an alkynylene group.

LL is preferably a single bond, an alkylene group, or an alkynylene group and more preferably a single bond, methylene, ethylene, ethynylene, —CH(CH$_3$)—, and —C(CH$_3$)$_2$—.

The bivalent linking groups in $LL^1$, $LL^{1'}$, $LL^2$, and $LL^{2'}$ are preferably an alkylene group, an arylene group, or an —O-alkylene group or an —O-arylene group in which an atom of a bond on at least a benzene ring side is an oxygen atom.

$LL^1$, $LL^{1'}$, $LL^2$, and $LL^{2'}$ are preferably a single bond, an alkylene group, an arylene group, or an —O-alkylene group or —O-arylene group in which an atom of a bond on at least a benzene ring side is an oxygen atom.

Here, the number of carbon atoms of the alkylene group is preferably 2 to 4, and the number of carbon atoms of the arylene group is preferably 6 to 12. The numbers of carbon atoms of the alkylene group and the arylene group in the —O-alkylene group or the —O-arylene group are preferably the same numbers of carbon atoms of single substances of the alkylene group and the arylene group.

Specific examples of the monomer expressed by any one of General formulae (ACL-A) to (ACL-C) are provided below, but the invention is not limited thereto.

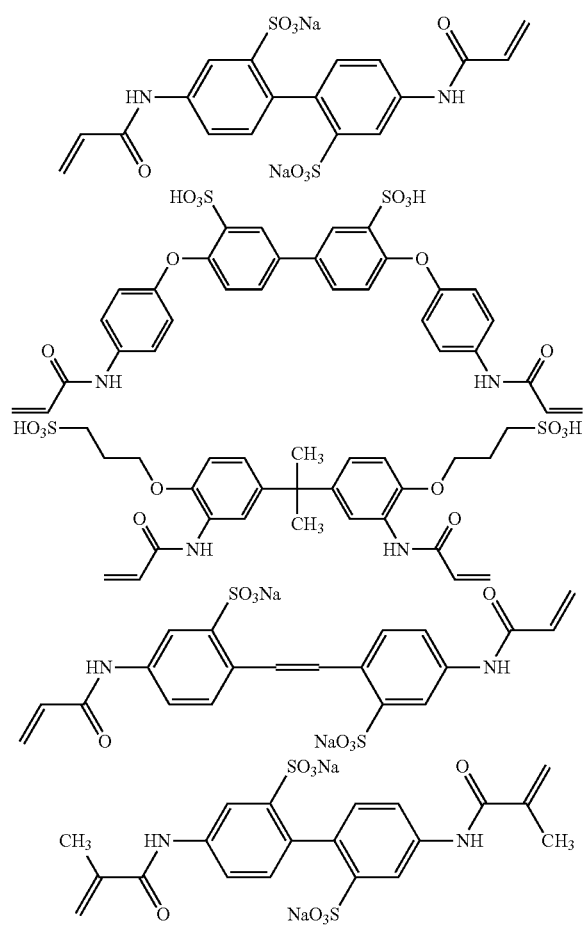

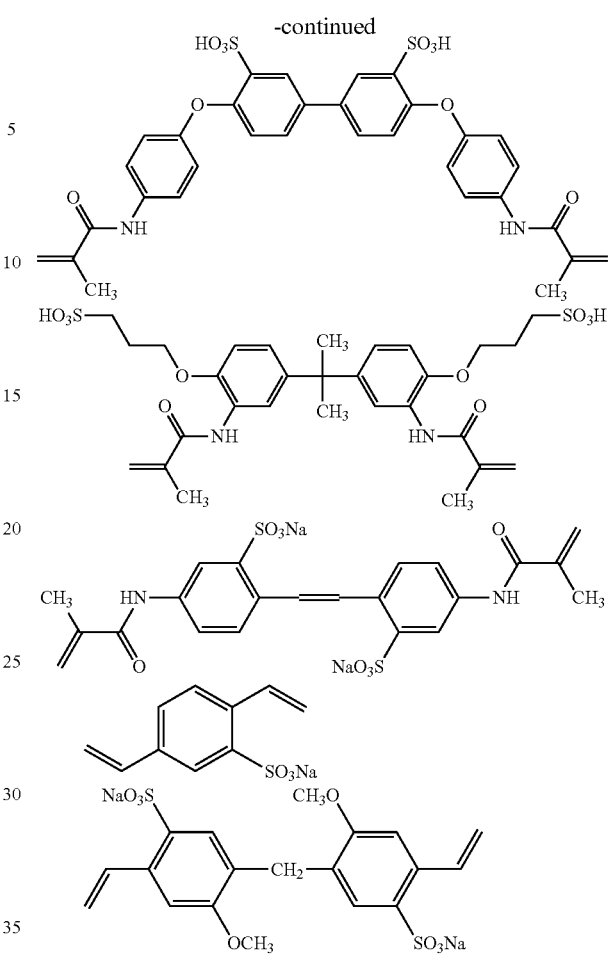

Here, the substituent group α is described below.

The substituent group α is a group of substituents consisting of substituents below.

(Substituent Group α)

Examples of the substituent group α may include an alkyl group (an alkyl group preferably having 1 to 30 carbon atoms, more preferably having 1 to 20 carbon atoms, and particularly preferably having 1 to 10 carbon atoms, and examples thereof include methyl, ethyl, isopropyl, t-butyl, n-octyl, 2-ethylhexyl, n-decyl, and n-hexadecyl), a cycloalkyl group (a cycloalkyl group preferably having 3 to 30 carbon atoms, more preferably having 3 to 20 carbon atoms, and particularly preferably having 3 to 10 carbon atoms, and examples thereof include cyclopropyl, cyclopentyl, and cyclohexyl), an alkenyl group (an alkenyl group preferably having 2 to 30 carbon atoms, more preferably having 2 to 20 carbon atoms, and particularly preferably having 2 to 10 carbon atoms, and examples thereof include vinyl, allyl, 2-butenyl, and 3-pentenyl), an alkynyl group (an alkynyl group preferably having 2 to 30 carbon atoms, more preferably having 2 to 20 carbon atoms, and particularly preferably having 2 to 10 carbon atoms, and examples thereof include propargyl and 3-pentynyl), an aryl group (an aryl group preferably having 6 to 30 carbon atoms, more preferably having 6 to 20 carbon atoms, particularly preferably having 6 to 12 carbon atoms, and examples thereof include phenyl, p-methylphenyl, naphthyl, and anthranyl), an amino group (an amino group includes an amino group, an alkylamino group, and an arylamino group, the amino group is an amino group preferably having 0 to 30 carbon atoms, more preferably having 0 to 20 carbon atoms, and particularly preferably having 0 to 10 carbon atoms, and examples thereof include amino, methylamino, dimethylamino, diethylamino, dibenzylamino, diphenylamino, and ditolylamino), an alkoxy group (an alkoxy group preferably having 1 to 30 carbon atoms, more preferably having 1 to 20 carbon atoms, particularly preferably having 1 to 10 carbon atoms, and examples thereof include methoxy, ethoxy, butoxy, and 2-ethylbexyloxy), an aryloxy group (an aryloxy group preferably having 6 to 30 carbon atoms, more preferably having 6 to 20 carbon atoms, and particularly preferably having 6 to 12 carbon atoms, and examples thereof include phenyloxy, 1-naphthyloxy, and 2-naphthyloxy), and a hetero ring oxy group (a hetero ring oxy group preferably having 2 to 30 carbon atoms, more preferably having 2 to 20 carbon atoms, particularly preferably having 2 to 12 carbon atoms, and examples thereof include pyridyloxy, pyradyloxy, and pyrimidyloxy, and quinolyloxy).

Examples of the substituent group α may include an acyl group (an acyl group preferably having 1 to 30 carbon atoms, more preferably having 1 to 20 carbon atoms, and particularly preferably having 1 to 12 carbon atoms, and examples thereof include acetyl, benzoyl, formyl, and pivaloyl), an alkoxycarbonyl group (an alkoxycarbonyl group preferably having 2 to 30 carbon atoms, more preferably having 2 to 20 carbon atoms, and particularly preferably having 2 to 12 carbon atoms, and examples thereof include methoxycarbonyl and ethoxycarbonyl), an aryloxycarbonyl group (an aryloxycarbonyl group preferably having 7 to 30 carbon atoms, more preferably having 7 to 20 carbon atoms, and particularly preferably having 7 to 12 carbon atoms, and examples thereof include phenyloxycarbonyl), an acyloxy group (an acyloxy group preferably having 2 to 30 carbon atoms, more preferably having 2 to 20 carbon atoms, and particularly preferably having 2 to 10 carbon atoms, and examples thereof include acetoxy and benzoyloxy), and an acylamino group (an acylamino group preferably having 2 to 30 carbon atoms, more preferably having 2 to 20 carbon atoms, and particularly preferably having 2 to 10 carbon atoms, and examples thereof include acetylamino and benzoylamino).

Examples of the substituent group α may include an alkoxycarbonylamino group (an alkoxycarbonylamino group preferably having 2 to 30 carbon atoms, more preferably having 2 to 20 carbon atoms, and particularly preferably having 2 to 12 carbon atoms, and examples thereof include methoxycarbonylamino), an aryloxycarbonylamino group (an aryloxycarbonylamino group preferably having 7 to 30 carbon atoms, more preferably having 7 to 20 carbon atoms, particularly preferably having 7 to 12 carbon atoms, and examples thereof include phenyloxycarbonylamino), an alkyl or aryl sulfonylamino group (preferably having 1 to 30 carbon atoms, more preferably having 1 to 20 carbon atoms, and particularly preferably having 1 to 12 carbon atoms, and examples thereof include methanesulfonylamino and benzenesulfonylamino), and a sulfamoyl group (the sulfamoyl group includes a sulfamoyl group, and an alkyl or aryl sulfamoyl group, the sulfamoyl group is a sulfamoyl group preferably having 0 to 30 carbon atoms, more preferably having 0 to 20 carbon atoms, and particularly preferably having 0 to 12 carbon atoms, and examples thereof include sulfamoyl, methylsulfamoyl, dimethylsulfamoyl, and phenylsulfamoyl).

Examples of the substituent group α, may include a carbamoyl group (the carbamoyl group includes a carbamoyl group, an alkyl or aryl carbamoyl group, the carbamoyl group is a carbamoyl group preferably having 1 to 30 carbon atoms, more preferably having 1 to 20 carbon atoms, and particularly preferably having 1 to 12 carbon atoms, and examples thereof include carbamoyl, methylcarbamoyl, diethylcarbamoyl, and phenylcarbamoyl), an alkylthio group (an alkylthio group preferably having 1 to 30 carbon atoms, more preferably having 1 to 20 carbon atoms, and particularly preferably having 1 to 12 carbon atoms, and examples thereof include methylthio, and ethylthio), an arylthio group (an arylthio group preferably having 6 to 30 carbon atoms, more preferably having 6 to 20 carbon atoms, and particularly preferably having 6 to 12 carbon atoms, and examples thereof include phenylthio), and a hetero ring thio group (a hetero ring thio group preferably having 2 to 30 carbon atoms, more preferably having 2 to 20 carbon atoms, and particularly preferably having 2 to 12 carbon atoms, and examples thereof include pyridylthio, 2-benzimidazolylthio, 2-benzoxazolylthio, and 2-benzothiazolylthio).

Examples of the substituent group α may include an alkyl or aryl sulfonyl group (an alkyl or aryl sulfonyl group preferably having 1 to 30 carbon atoms, more preferably having 1 to 20 carbon atoms, and particularly preferably having 1 to 12 carbon atoms, and examples thereof include mesyl and tosyl), an alkyl or aryl sulfinyl group (an alkyl or aryl sulfinyl group preferably having 1 to 30 carbon atoms, more preferably having 1 to 20 carbon atoms, and particularly preferably having 1 to 12 carbon atoms, and examples thereof include methanesulfinyl, and benzenesulfinyl), an ureido group (an ureido group preferably having 1 to 30 carbon atoms, more preferably having 1 to 20 carbon atoms, particularly preferably having 1 to 12 carbon atoms, and examples thereof include ureido, methylureido, and phenylureido), a phosphoric acid amide group (a phosphoric acid amide group preferably having 1 to 30 carbon atoms, more preferably having 1 to 20 carbon atoms, particularly preferably having 1 to 12 carbon atoms, and examples thereof include diethyl phosphoric acid amide and phenyl phosphoric acid amide), a hydroxy group, a mercapto group, and a halogen atom (for example, a fluorine atom, a chlorine atom, a bromine atom, and an iodine atom, and a fluorine atom is more preferable).

Examples of the substituent group α may include a cyano group, a sulfo group, a carboxyl group, an oxo group, a nitro group, a hydroxamic acid group, a sulfino group, a hydrazino group, an imino group, and a hetero ring group (a hetero ring group preferably having 1 to 30 carbon atoms and more preferably having 1 to 12 carbon atoms, as a ring-constituting hetero atom, for example, a nitrogen atom, an oxygen atom, and a sulfur atom are preferable, and specific examples thereof include imidazolyl, pyridyl, quinolyl, furyl, thienyl, piperidyl, morpholino, benzoxazolyl, benzimidazolyl, benzothiazolyl, a carbazolyl group, and an azepinyl group), a silyl group (a silyl group preferably having 3 to 40 carbon atoms, more preferably having 3 to 30 carbon atoms, and particularly preferably having 3 to 24 carbon atoms, and examples thereof include trimethylsilyl and triphenylsilyl), and a silyloxy group (a silyloxy group preferably having 3 to 40 carbon atoms, more preferably having 3 to 30 carbon atoms, particularly preferably having 3 to 24 carbon atoms, and examples thereof include trimethylsilyloxy and triphenylsilyloxy).

These substituents may be further substituted with any one or more substituents selected from the substituent group α above.

According to the invention, when there are plural substituents in one structural portion, the substituents may be linked to each other to form a ring or may be condensed with a portion or all of the structural portion to form an aromatic ring or an unsaturated heterocyclic ring.

<Monofunctional Monomer>

According to the invention, in addition to the crosslinking agent, the polymerizable functional group preferably uses one monofunctional monomer, together.

As this monofunctional monomer, any monomers can be used.

In the case where the monofunctional monomer is a cationic monomer, the monomer expressed by General formula (CM-A) or (CM-B) below is preferable, and in the case where the monofunctional monomer is an anionic monomer, the monomer expressed by General formula (AM-A) or (AM-B) below is preferable.

The alkylene group, the arylene group, and the bivalent linking group obtained by combining these in $L^{10}$, $L^{20}$, and $L^{30}$ have the same meanings as the alkylene group, the arylene group, or the bivalent linking group obtained by combining these in L, $L^1$, $L^2$, and $L^{2'}$ of General formula (CCL,-A) to (CCL-C), and and the preferable scopes thereof are the same.

However, $L^{30}$ is preferably naphthylene, in addition to phenylene. In the case where $L^{30}$ has a substituent, A preferably has a substituent.

Specific examples of the monomer expressed by General formulae (CM-A), (CM-B), (AM-A) or (AM-B) are provided below, but the invention is not limited thereto.

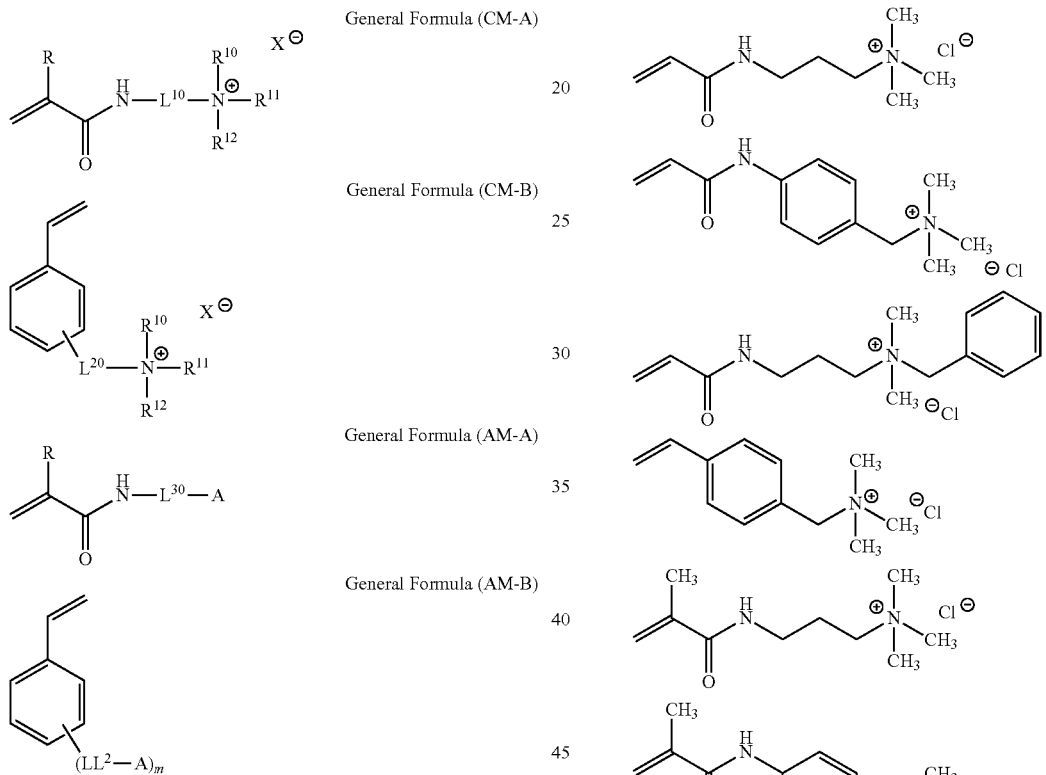

In General formulae (CM-A), (CM-B), (AM-A), and (AM-B), R and X have the same meanings as R and X in General formulae (CCL-A) to (CCL-C), and the preferable scopes thereof are also the same. $LL^2$, A, and m have the same meanings as $LL^2$, A, and m in General formula (ACL-C), and the preferable scopes thereof are the same.

Each of $R^{10}$ to $R^{12}$ independently represents an alkyl group or an aryl. group. At least two of $R^{10}$ to $R^{12}$ may be bonded to each other to form a ring. Each of $L^{10}$, $L^{20}$, and $L^{30}$ independently represents an alkylene group, an arylene group, or a bivalent linking group obtained by combining these.

The alkyl groups and the aryl groups in $R^{10}$ to $R^{12}$ have the same meanings as the alkyl groups and the aryl groups in $R^1$ and $R^2$ of General formula (CCL-A), and preferably scopes thereof are the same.

A ring formed by bonding these is preferably a 5-membered or 6-membered ring, and examples thereof include a piperidine ring, a piperazine ring, a morpholine ring, and a thiomorpholine ring.

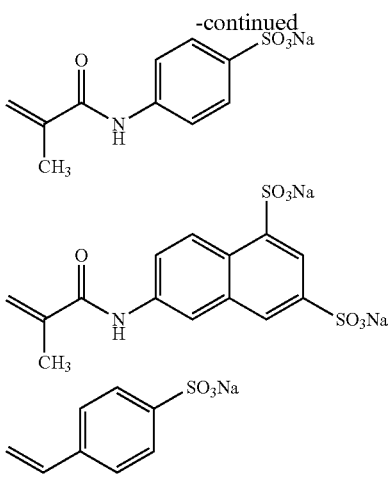

According to the invention, with respect to the blending amount of the crosslinking agent and the monofunctional monomer, the content of the monofunctional monomer is preferably 0 parts by mass to 120 parts by mass, more preferably 0 parts by mass to 100 parts by mass, and even more preferably 0 parts by mass to 80 parts by mass with respect to 100 parts by mass of the crosslinking agent.

According to the invention, a monofunctional monomer and a crosslinking agent not having an ionic group may be used, depending on relationships thereof with the hydrophobicity index H.

<Polymerization Initiator>

The polymerizing and curing reaction according to the invention is preferably performed in the coexistence of the polymerization initiator.

Among the polymerization initiators, according to the invention, a photopolymerization initiator that can be polymerized with active radiation irradiation is preferable.

Examples of the photopolymerization initiator include aromatic ketones, an acylphosphine compound, an aromatic onium salt compound, organic oxide, a thio compound, hexaarylbiimidazole compound, a ketoxime ester compound, a borate compound, an azinium compound, a metallocene compound, an active ester compound, compounds having a carbon halogen bond, and an alkyl amine compound.

Preferably examples of the aromatic ketone compound, the acylphosphine compound, and the thio compound include compounds having a benzophenone skeleton or a thioxanthone skeleton disclosed in "RADIATION CURING IN POLYMER SCIENCE AND TECHNOLOGY", pages 77 to 117 (1993). More preferable examples include an α-thiobenzaphenone compound disclosed in JP1972-6416B (JP-S47-6416B), a benzoin ether compound disclosed in JP1972-3981B (JP-S47-3981B), an α-substituted benzoin compound disclosed in JP1972-22326B (JP-S47-22326B), a benzoin derivative disclosed in JP1972-23664B (JP-S47-23664B), aroyl phosphonic acid ester disclosed in JP1982-30704A (JP-S57-30704A), dialkoxybenzophenone disclosed in JP1985-26483B (JP-S60-26483B), benzoin ether disclosed in JP1985-26403B (JP-S60-26403B) and JP1987-81345A (JP-S62-81345A), α-aminobenzophenone disclosed in JP1989-34242B (JP-H1-34242B), U.S. Pat. No. 4,318,791A, and EP0284561A 1, p-di(dimethylaminobenzoyl)benzene disclosed in JP1990-211452A (JP-H2-211452A), thio-substituted aromatic ketone disclosed in JP1986-194062A (JP-S61-194062A), acylphosphinesulfide disclosed in JP 1990-9597B (JP-H2-9597B), acylphosphine disclosed in JP1990-9596B (JP-H2-9596B), a thioxanthone compound disclosed in JP1988-61950B (JP-S63-61950B), and coumarin disclosed in JP1984-42864B (JP-S59-42864B). Polymerization initiators disclosed in JP2008-105379A and JP2009-114290A are also preferable. Examples of the polymerization initiators disclosed in pages 65 to 148 of "ULTRAVIOLET LIGHT CURING SYSTEM" (issued by General Technology Center, 1989) written by KATO Kiyomi.

The polymerization initiator according to the invention is preferably a water soluble polymerization initiator.

Here, the fact that the polymerization initiator is water soluble means that 0.1 mass % or greater of the polymerization initiator is dissolved in distilled water at 25° C.

The water soluble polymerization initiator is more preferably dissolved by 1 mass % or greater and even more preferably dissolved by 3 mass % or greater in distilled water at 25° C.

According to the invention, in the case of photopolymerizing and curing reaction, a photoradical polymerization initiator is preferable, and among these, compounds expressed by General formula (PPI-1) or (PPI-2) below are preferable.

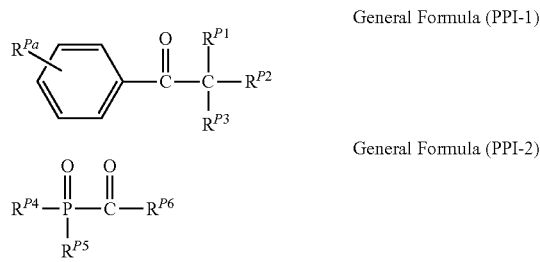

General Formula (PPI-1)

General Formula (PPI-2)

In General formulae (PPI-1) and (PPI-2), $R^{P1}$ represents a hydrogen atom, an alkyl group, alkenyl group, aryl group, hydroxy group, alkoxy group, aryloxy group, alkylthio group, arylthio group, dialkylamino group, or a hetero ring amino group, and each of $R^{P2}$ and $R^{P3}$ independently represents a hydrogen atom, an alkyl group, an alkenyl group, an aryl group, an alkoxy group, an aryloxy group, an alkylthio group, an arylthio group, a dialkylamino group, or a hetero ring amino group. $R^{Pa}$ represents a hydrogen atom or a substituent. Each of $R^{P4}$ and $R^{P5}$ independently represents an alkyl group, an aryl group, an alkylthio group, an arylthio group, or an acyl group, and $R^{P6}$) represents an alkyl group or an aryl group. Here, $R^{P2}$ and $R^{P3}$ or $R^{P4}$ and $R^{P5}$ may be bonded to each other to form a ring.

The number of carbon atoms of the alkyl group in $R^{P1}$ to $R^{P6}$ is preferably 1 to 12, more preferably 1 to 8, and even more preferably 1 to 4, and examples thereof include methyl, ethyl, isopropyl, n-butyl, 2-ethylhexyl, and dodecyl.

The number of carbon atoms of the alkenyl group in $R^{P1}$ to $R^{P3}$ is preferably 2 to 12, more preferably 2 to 8, and even more preferably 2 to 4, and examples thereof include vinyl, allyl, 1-propenyl, 2-butenyl, and 2-pentenyl.

The number of carbon atoms of the aryl group in $R^{P1}$ to $R^{P6}$ is preferably 6 to 12 and more preferably 6 to 10, and examples thereof include phenyl and naphthyl.

The aryl group is preferably a phenyl group that may have a substituent.

The number of carbon atoms of the alkoxy group in $R^{P1}$ to $R^{P3}$ is preferably 1 to 12, more preferably 1 to 8, and even more preferably 1 to 4, and examples thereof include methoxy, ethoxy, isopropoxy, n-butoxy, 2-ethythexyloxy, and dodecyloxy.

The number of carbon atoms of the aryloxy group in $R^{P1}$ to $R^{P3}$ is preferably 6 to 12 and more preferably 6 to 10, and examples thereof include phenoxy and naphthoxy.

The number of carbon atoms of the alkylthio group in $R^{P1}$ to $R^{P5}$ is preferably 1 to 12, more preferably 1 to 8, and even more preferably 1 to 4, and examples thereof include methylthio, ethylthio, isopropylthio, n-butylthio, 2-ethylhexylthio, and dodecylthio.

The number of carbon atoms of the arylthio group in $R^{P1}$ to $R^{P5}$ is preferably 6 to 12 and more preferably 6 to 10, and examples thereof include phenylthio and naphthylthio.

The number of carbon atoms of the dialkylamino group in $R^{P1}$ to $R^{P3}$ is preferably 2 to 12 and more preferably 2 to 10, and examples thereof include dimethylamino, ethylmethylamino, diethylamino, and di-n-butylamino.

The number of carbon atoms of the hetero ring amino group in $R^{P1}$ to $R^{P3}$ is preferably 3 to 12, more preferably 4 to 8, and even more preferably 4 or 5. The hetero ring of the hetero ring amino group is preferably 5-membered or 6-membered ring, and examples thereof include pyrrolidino, piperidino, morpholino, and thiomoipholino.

Examples of the acyl group in $R^{P4}$ or $RP^5$ include substituents described in the substituent group α above.

Each group of $R^{P1}$ to $R^{P6}$ may be substituted with a substituent, and examples of the substituent include substituents described in the substituent group α above.

Among the substituent group α, an alkyl group, an alkenyl group, an aryl group, a hetero ring amino group (among these, pyrrolidino, piperidino, morpholino, and thiomorpholino are preferable), an amino group (—NH$_2$), an alkylamino group, a dialkylamino group, an arylamino group, a hydroxy group, an alkoxy group, an aryloxy group, an alkylthio group, an arylthio group, an acyl group, a sulfo group, or salts thereof, a carboxy group, and or salts thereof are preferable.

For example, as the substituted alkyl group, a hydroxyalkyl group, a pyrrolidinoalkyl group, a piperidinoalkyl group, a morpholinoalkyl group, a thiomorpholinoalkyl group, an aminoalkyl group, an alkylaminoalkyl group, a dialkylaminoalkyl group, and an arylaminoalkyl group are preferable.

As the substituted aryl group, an alkyl substituted aryl group, a hydroxy substituted aryl group, a pyrrolidino substituted aryl group, a piperidino substituted aryl group, a morpholino substituted aryl group, a thiomorpholino substituted aryl group, an amino substituted aryl group, an alkylamino substituted aryl group, a dialkylamino substituted aryl group, and an arylamino substituted aryl group are preferable.

As a substituted alkenyl group, a substituted alkoxy group, a substituted aryloxy group, a substituted alkylthio group, a substituted arylthio group, and a hetero ring amino group, preferable examples are the same. As the substituted dialkylamino group, a dialkylamino group substituted with an arylalkyl group is preferable.

Among these, a hydroxyalkyl group, a dialkylaminoalkyl group, a morpholinoalkyl group, a hydroxyalkoxy group, and a morpholino substituted aryl group are preferable.

$R^{P1}$ is preferably a hydroxy group, a pyrrolidino group, a piperidino group, a morpholino group, a thiomorpholino group, or a dialkylamino group, $R^{P2}$ and $R^{P3}$ are preferably an alkyl group, an aryl group, alkoxy group, or an alkylthio group, and a group obtained by bonding $R^{P2}$ and $R^{P3}$, form a cyclohexane ring is preferable.

$R^{Pa}$ represents a hydrogen atom or a substituent. Examples of the substituent include the substituent group α described above and the hetero ring amino group in $R^{P1}$ to $R^{P3}$, and an alkyl group, an alkenyl group, an aryl group, an alkoxy group, an aryloxy group, an alkylthio group, an arylthio group, a dialkylamino group, or a hetero ring amino group are preferable.

Here, examples of the substituent that may be substituted with the substituent include a hydroxy group. As $R^{Pa}$, a hydroxyalkoxy group or groups below are preferable.

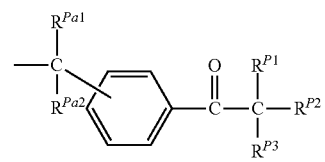

Here, $R^{P1}$ to $R^{P3}$ have the same meanings as $R^{P1}$ to $RP^{P3}$ in General formula (PPI-1), and the preferable ranges thereof are the same. Each of $R^{Pa1}$ and $R^{Pa2}$ independently represents a hydrogen atom or a substituent.

Examples of the substituents in $R^{Pa1}$ and $R^{Pa2}$ include the substituent group α described above, and an alkyl group, an alkenyl group, an aryl group, an alkoxy group, an aryloxy group, an alkylthio group, an arylthio group, or a dialkylamino group is preferable.

An alkyl group, an alkenyl group, an aryl group, an alkoxy group, an aryloxy group, an alkylthio group, an arylthio group, and a dialkylamino group are preferably corresponding groups exemplified in $R^{P2}$ or $R^{P3}$.

A ring formed by bonding $R^{P2}$ and $R^{P3}$ to each other is preferably a 5-membered or 6-membered ring. Among these, a cyclopentane ring or a cyclohexane ring is preferable.

The polymerization initiator expressed by General formula (PPI-1) is more preferable to the polymerization initiator expressed by General formula (PPI-2).

Specific examples of the polymerization initiator expressed by General formula (PPI-1) or (PPI-2) are provided below, but the invention is not limited thereto.

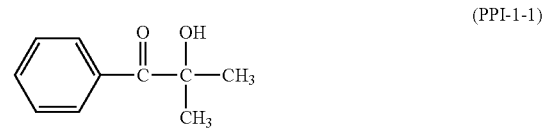
(PPI-1-1)

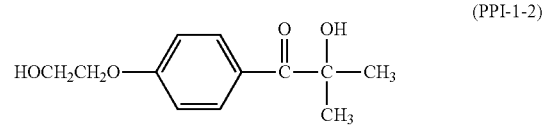
(PPI-1-2)

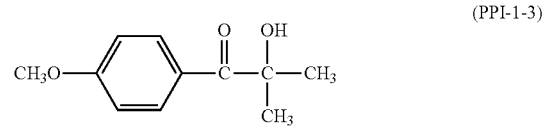
(PPI-1-3)

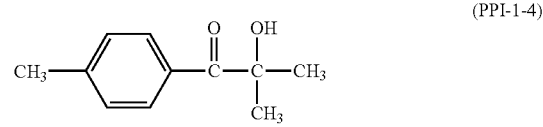
(PPI-1-4)

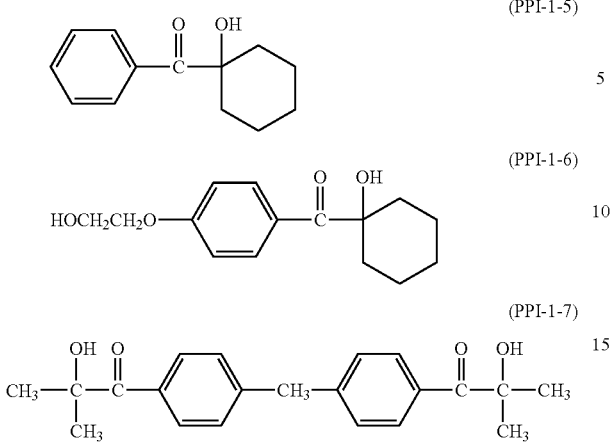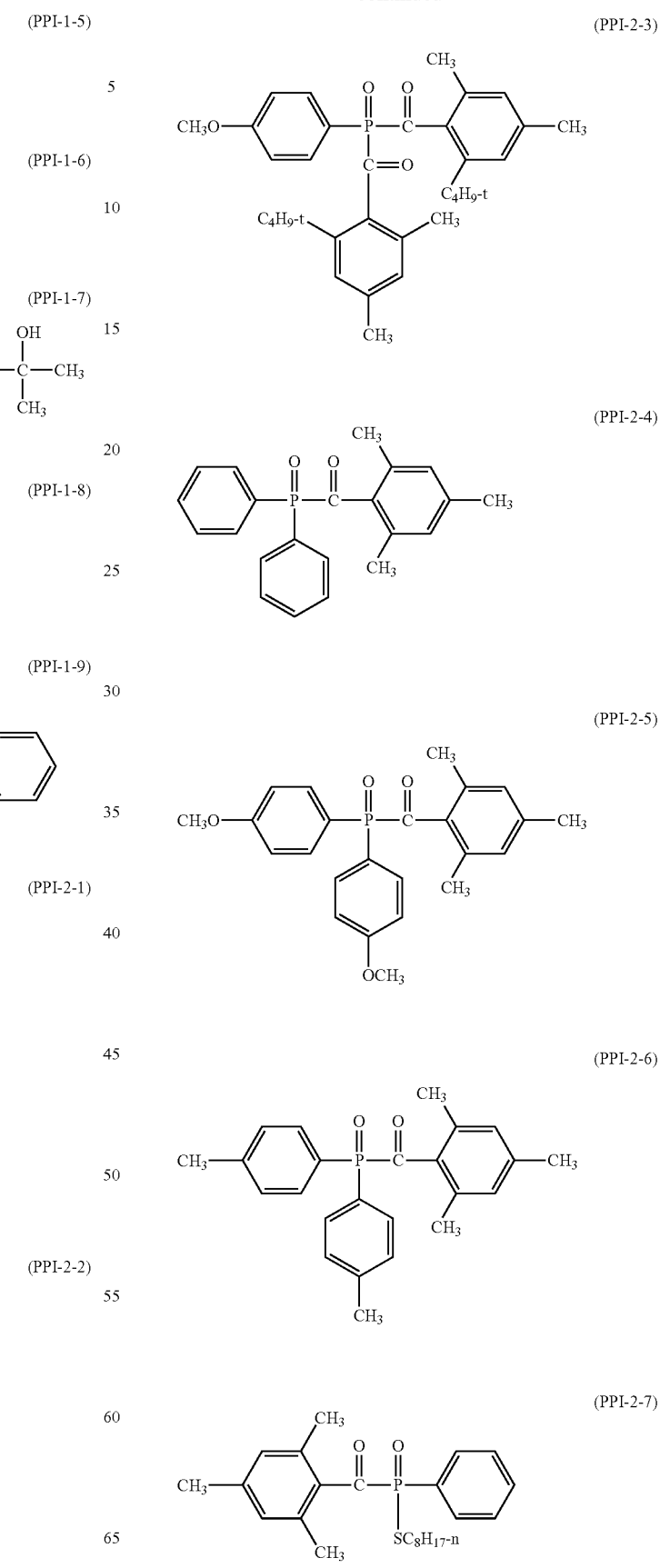

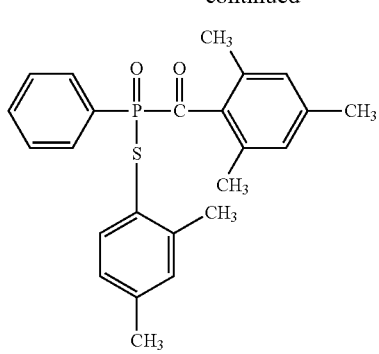

(PPI-2-8)

The polymerization initiator expressed by General formula (PPI-1) or (PPI-2) can be obtained from BASF Japan, Ltd. or the like.

According to the invention, the content of the polymerization initiator expressed by General formula (PPI-1) or (PPI-2) is preferably 0.1 parts by mass to 20 parts by mass, more preferably 0.1 parts by mass to 10 parts by mass, and particularly preferably 0.5 parts by mass to 5 parts by mass with respect to 100 parts by mass which is the total solid content of the ion exchange membrane forming composition.

According to the invention, together with the polymerization initiator, a radical polymerization initiator expressed by General formula (AZI) below that generates radicals by heat or light is preferably used, and particularly preferably used in the case where thermal polymerizing and curing is performed.

General Formula (AZI)

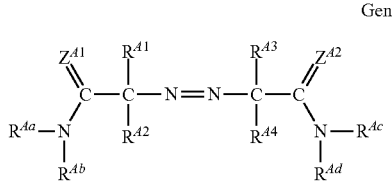

In General formula (AZI), each of $Z^{A1}$ and $Z^{A2}$ independently represents =O or =N—$R^{Ae}$. Each of $R^{A1}$ to $R^{A4}$ independently represents an alkyl group. Each of $R^{Aa}$ to $R^{Ae}$ independently represents a hydrogen atom or an alkyl group. At least two of $R^{Aa}$, $R^{Ab}$, and $R^{Ae}$, at least two of $R^{Ac}$, $R^{Ad}$, and $R^{Ae}$, and/or at least two $R^{Aa}$, $R^{Ac}$, and $R^{Ad}$ may be bonded to each other to form a ring.

The alkyl groups in $R^{A1}$ to $R^{A4}$ preferably have 1 to 8 carbon atoms and more preferably has 1 to 4 carbon atoms, and methyl is particularly preferable.

$R^{Aa}$ to $R^{Ad}$ are preferably hydrogen atoms and an alkyl group having 1 to 8 carbon atoms.

The ring formed by $R^{Aa}$ and $R^{Ab}$, $R^{Ac}$ and $R^{Ad}$, $R^{Aa}$ and $R^{Ac}$, and $R^{Ab}$ and $R^{Ad}$ bonded to each other is preferably a 5- or 6-membered ring.

The ring formed by $R^{Aa}$ and $R^{Ae}$, and $R^{Ac}$ and $R^{Ae}$ bonded to each other is particularly preferably an imidazoline ring, and, as the ring formed by $R^{Aa}$ and $R^{Ab}$, and $R^{Ac}$ and $R^{Ad}$ bonded to each other, and a pyrrolidine ring, a piperidine ring, a piperazine ring, a morpholine ring, and a thiomorpholine ring are particularly preferable.

$Z^{A1}$ and $Z^{A2}$ are preferably =N—$R^{Ae}$.

Hereinafter, specific examples of the polymerization initiator expressed by General Formula (AZI) are provided, but the invention is not limited thereto.

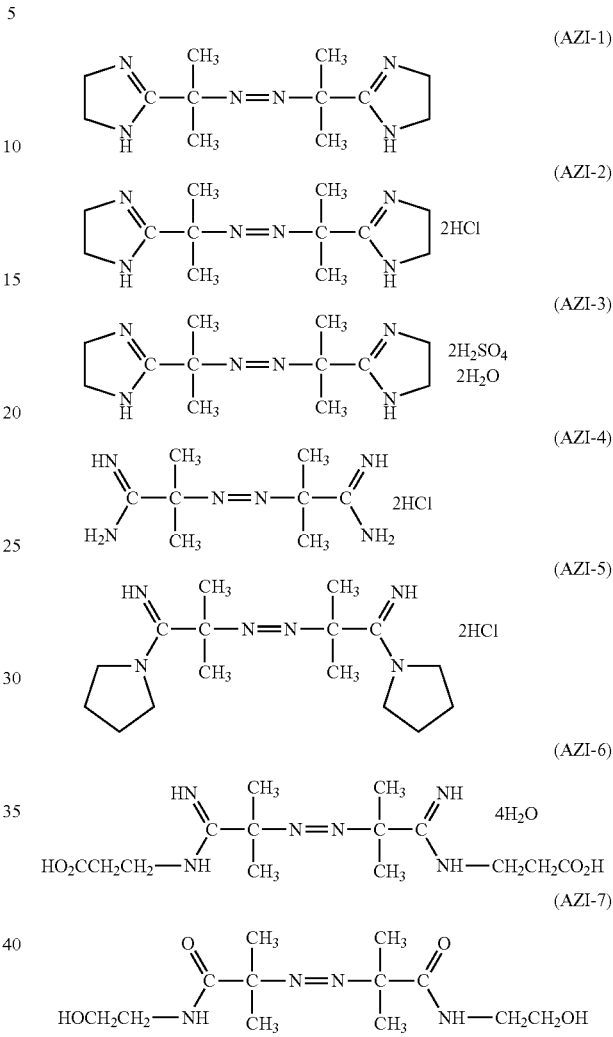

The polymerization initiator expressed by General Formula (AZI) can be obtained from Wako Pure Chemical Industries, Ltd., and, for example, an exemplary compound (AZI-1) is commercially available as VA-061, an exemplary compound (AZI-2) is commercially available as VA-044, an exemplary compound (AZI-3) is commercially available as VA-046B, an exemplary compound (AZI-4) is commercially available as V-50, an exemplary compound (AZI-5) is commercially available as VA-067, an exemplary compound (AZI-6) is commercially available as VA-057, and an exemplary compound (AZI-7) is commercially available as VA086 (all are product names).

According to the invention, the content of the polymerization initiator expressed by General Formula (AZI) is preferably 0.1 parts by mass to 20 parts by mass, more preferably 0.1 parts by mass to 10 parts by mass, and particularly preferably 0.5 parts by mass to 5 parts by mass with respect to 100 parts by mass which is the total solid content of the composition for forming the ion exchange membrane.

<Polymerization Inhibitor>

According to the invention, the polymerization inhibitor preferably is included in the curable composition.

As the polymerization inhibitor, well-known polymerization inhibitors can be used, and examples thereof include a phenol compound, a hydroquinone compound, an amine compound, and a mercapto compound.

Specific examples of the phenol compound include hindered phenol (phenol having a t-butyl group in an ortho position, and examples thereof typically include 2,6-di-t-butyl-4-methylphenol), and bisphenol. Specific examples of the hydroquinone compound include mono methyl ether hydroquinone. Specific examples of the amine compound include N-nitroso-N-phenylhydroxylamine, and N,N-diethylhydroxylamine.

These polymerization inhibitors may be used singly or two or more types thereof may be used in combination.

The content of the polymerization inhibitor is preferably 0.01 parts by mass to 5 parts by mass, more preferably 0.01 parts by mass to 1 part by mass, and even more preferably 0.01 parts by mass to 0.5 parts by mass with respect to 100 parts by mass which is the total solid content of the curable composition.

<Alkali Metal Compound>

The ion exchange membrane forming composition for manufacturing the ion exchange membrane according to the invention may include an alkali metal compound in order to improve solubility of the monomer, particularly the compound having (meth)alkylamide structure not having an ionic group. As the alkali metal compound, hydroxide salts of lithium, sodium, and potassium, chloride salt, nitride salt, and the like are preferable. Among these, a lithium compound is more preferable, and specific examples thereof include lithium hydroxide, lithium chloride, lithium bromide, lithium nitride, lithium iodide, lithium chlorate, lithium thiocyanate, lithium perchlorinate, lithium.tetrafluoroborate, lithium-hexafluorophosphate, and lithium-exafluoroarsenate.

Here, an alkali metal compound is preferably used in order to neutralize the ion exchange membrane forming composition (solution of the ion exchange membrane forming composition).

These alkali metal compounds may be hydrate. These alkali metal compounds may be used singly or two or more types thereof may be used in combination.

The addition amount in the case where the alkali metal compound is added is preferably 0.1 parts by mass to 20 parts by mass, more preferably 1 part by mass to 20 parts by mass, and even more preferably 5 parts by mass to 20 parts by mass with respect to 100 parts by mass which is the total solid content of the the ion exchange membrane forming composition.

<Other Components>

In addition to the components described above, the the ion exchange membrane forming composition may include a surface tension adjuster, a surfactant, a high molecular weight dispersant, a viscosity improver, a preservative, and an anti-crater agent.

<Solvent>

The ion exchange membrane forming composition according to the invention may include a solvent. The content of the solvent in the ion exchange membrane forming composition is preferably 5 mass % to 35 mass %, more preferably 10 mass % to 35 mass %, and even more preferably 20 mass % to 35 mass % with respect to 100 mass % of the ion exchange membrane forming composition.

If the solvent is included, the curing (polymerization) reaction evenly and smoothly proceeds. In the case where the ion exchange membrane forming composition is impregnated to the porous support, impregnation smoothly proceeds.

As the solvent, water or a mixed solvent of water and a solvent of which solubility with water is 5 mass % or greater is preferably used, a solvent that is freely mixed with water is preferable. Therefore, a solvent selected from water and a water soluble solvent is preferable.

As the water soluble solvent, an alcohol-based solvent, an ether-based solvent, an amide-based solvent, a ketone-based solvent, a sulfoxide-based solvent, a sulfone-based solvent, a nitrile-based solvent, and an organic phosphorus-based solvent which are aprotic polar solvents are particularly preferable.

Examples of the alcohol-based solvent include methanol, ethanol, isopropanol, n-butanol, ethylene glycol, propylene glycol, diethylene glycol, and dipropylene glycol. The alcohol-based solvents may be used singly or two or more types thereof may be used in combination.

With respect to the aprotic polar solvent, preferable solvents include dimethyl sulfoxide, dimethyl imidazolidinone, sulfolane, N-methylpyrrolidone, dimethylformamide, acetonitrile, acetone, dioxane, tetramethylurea, hexamethylphosphoramide, hexamethylphosphorotriamide, pyridine, propionitrile, butanone, cyclohexanone, tetrahydrofuran, tetrahydropyran, ethylene glycol diacetate, and γ-butyrolactone. Among these, dimethyl sulfoxide, N-methylpyrrolidone, dimethylformamide, dimethyl imidazolidinone, sulforane, acetone, acetonitrile, and tetrahydrofuran are preferable. The aprotic polar solvents may be used singly or two or more types thereof may be used in combination.

<Support>

In order to provide the ion exchange membrane having high mechanical strength, many technologies can be used. For example, it is possible to use a support as a reinforcing material of the membrane, and a porous support can be preferably used. A portion of the membrane can be formed by coating and/or impregnating the porous support with the ion exchange membrane forming composition and polymerizing and curing this composition.

Examples of the porous support as the reinforcing material include synthetic woven fabric, a synthetic nonwoven fabric, a sponge-shaped film, or a film having fine through holes. Examples of the material for forming the porous support may include porous membranes based on polyolefin (polyethylene, polypropylene, and the like), polyacrylonitrile, polyvinyl chloride, polyester, polyamide, and copolymers thereof; or porous membranes based on polysulfone, polyether sulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl-1-pentene), polyvinylidene fluoride, polytetratluoroethylene, polyhexafluoropropylene, polychlorotrifluoroethylene, and copolymers thereof. Among these, according to the invention, polyolefin is preferable.

Commercially available porous supports or the commercially available reinforcing materials are, for example, commercially available from Japan Vilene Company, Ltd., Freudenberg Filtration Technologies (Novatexx material), and Sefar AG.

In the case where photopolymerizing and curing reaction is performed, it is required that the porous support and the reinforcing material do not block the wavelength range of the irradiation light, that is, pass the irradiation of wavelengths used in the polymerizing and curing. However, in the case where the thermal polymerizing and curing reaction is performed, there is not need to consider this. It is preferable that the porous reinforcing material is a material which the curable composition that forms the ion exchange membrane easily permeates.

It is preferable that the porous support or the reinforcing material has hydrophilicity. In order to provide hydrophilicity to the support, general methods such as a corona treatment, an ozone treatment, a sulfate treatment, and a silane coupling agent treatment can be used.

In the case where the support is provided, the membrane thickness of the ion exchange membrane including the support is preferably 30 µm to 150 µm, more preferably 60 µm to 130 µm, and particularly preferably 70 µm to 110 µm.

Here, the membrane thickness of the ion exchange membrane according to the invention is specifically the membrane thickness of a functional polymer membrane after being left for at least 12 hours in a 0.1 M NaCl solution, as presented in the examples.

<<Characteristics of Ion Exchange Membrane>>

It is preferable that the ion exchange membrane according to the invention has characteristics below.

In order to cause the low electrical resistance and the low water permeability to be compatible with each other, the ion exchange resin according to the invention is preferably caused to have low electrical resistance ER ($\Omega \cdot cm^2$) of the membrane and low water permeability WP ($\times 10^{-5}$ mL/m$^2$/Pa/hr). Particularly, as the value of ER×WP which is the product thereof is lower, the value is more preferable. The product thereof is preferably 13.5 or less, more preferably 12.0 or less, and even more preferably 10.0 or less.

If the ion exchange resins are the same, it is possible to control the electrical resistance of the membrane and the water permeability while the value of ER×WP is maintained by controlling the membrane thickness or the like. Therefore, the value of ER×WP is important as an index indicating the compatibility between the low electrical resistance of the membrane and the low water permeability.

The measurement and the calculation of the electrical resistance ER of the membrane and the water permeability WP can be performed by the measurement and calculation methods in the examples.

Since three dimensional crosslink is formed, a mass average molecular weight of the polymer forming the ion exchange membrane according to the invention is several hundreds of thousands or greater and may not be substantially measured. Generally, the mass average molecular weight is considered to be infinite.

<<Method for Manufacturing Ion Exchange Membrane>>

The ion exchange membrane according to the invention is manufactured in a method for manufacturing an ion exchange membrane by perform manufacturing by using an ionic monomer having at least two or more polymerizable functional groups, by polymerizing and curing the monomer for forming the ion exchange resin and the material fixed to the resin in the ion exchange membrane to be a material having the hydrophobicity index H calculated by the expression below of 1.6 or greater.

Hydrophobicity index $H=\Sigma\{(\log P$ of each component$)\times$(molar ratio of each material in resin)$\}$ The polymerizing and curing may be photopolymerizing and curing or thermal polymerizing and curing, or may be a combination thereof.

The coating liquid which is the polymerized and cured ion exchange membrane forming composition is preferably an coating liquid having a moisture content of 35 mass % or less and more preferably an coating liquid having a moisture content of greater than 0 mass % and 30 mass % or less.

An example of the method for manufacturing the ion exchange membrane according to the invention is specifically described below.

The ion exchange membrane according to the invention can be prepared in a batch type by using a fixed support (batch method), but the membrane is prepared in a continuous type by using a transferred support (continuous method). The support may be a roll shape that is continuously rewound. In the case of the continuous method, steps of loading the support on a belt that continuously moves, continuously applying the coating liquid which is the ion exchange membrane forming composition, polymerizing and curing the coating liquid, and forming the membrane can be continuously performed. However, any one of the applying step and the membrane forming step may be continuously performed.

Independently from the support, the ion exchange membrane forming composition is immersing in the porous support, and a temporary support (after the curing reaction is completed, the membrane is peeled from the temporary support) may be used until the polymerizing and curing reaction is completed.

This temporary support is not particularly limited, as long as there is no need to consider material penetration, and the temporary support includes, for example, a metal plate such as a polyethylene terephthalate (PET) film or an aluminum plate and can be fixed for forming the membrane.

Polymerizing and curing can be performed without using a support other than the porous support, by immersing the ion exchange membrane forming composition in the porous support.

The ion exchange membrane forming composition can be applied or immersed on the porous support by various methods, for example, curtain coating, extrusion coating, air-knife coating, slide coating, nip roll coating, forward roll coating, reverse roll coating, immersing coating, kiss coating, rod bar coating, or spray coating. The application of the plural layers can be performed at the same time or continuously. In order to apply the plural layers at the same time, curtain coating, slide coating, slot die coating, and extrusion coating are preferable.

With respect to the manufacturing of the ion exchange membrane in the continuous method, the ion exchange membrane forming composition to the transferred support is continuously manufactured more preferably by a manufacturing unit including an ion exchange membrane forming composition applying unit, an irradiation source for polymerizing and curing the ion exchange membrane forming composition, a membrane collecting portion for collecting the formed membrane, and means for transferring the support from the unit for applying the ion exchange membrane forming composition to the irradiation source and the membrane collecting portion.

In this manufacturing example, the ion exchange membrane according to the invention is manufactured by steps of (i) applying and/or impregnating the ion exchange membrane forming composition for forming the membrane according to the invention on the support (preferably the porous support), (ii) performing polymerizing and curing reaction on the ion exchange membrane forming composition by active radiation irradiation or heating, and (iii) removing the membrane from the support, if desired.

In the step (ii), the heating may be performed in combination with active radiation irradiation.

In the step (i), it is preferable that he ion exchange membrane forming composition is impregnated to the support.

[Active Radiation Irradiation]

In the manufacturing unit, the ion exchange membrane forming composition applying unit is provided at an upstream position of the irradiation source, and the irradiation source is provided at an upstream position of the collecting portion.

In order to provide sufficient fluidity for application with a high speed applicator, the viscosity of the ion exchange membrane forming composition at 35° C. is preferably less than 4,000 mPa·s, more preferably 1 mPa·s to 1,000 mPa·s, and most preferably 1 mPa·s to 500 mPa·s. In the case of slide bead coating, the viscosity at 35° C. is preferably 1 mPa·s to 100 mPa·s.

In the high speed applicator, the coating liquid which is the ion exchange membrane forming composition can be applied to the transferred support at a speed of greater than 15 m/min, and also can be applied at a speed of greater than 400 m/min.

Particularly, in the case where the support is used in order to enhance the mechanical strength, before the ion exchange membrane forming composition is applied to the surface of the support, this support may be subjected to a corona discharge treatment, a glow discharge treatment, a flame treatment, an ultraviolet irradiation treatment, and the like, for example, in order to improve the wettability and adhesion force of the support.

The polymerizing and curing of the ion exchange membrane forming composition starts preferably within 60 seconds, more preferably within 15 seconds, particularly preferably within 5 seconds, and most preferably within 3 seconds, from application or impregnation of the ion exchange membrane forming composition to the support.

The light irradiation time of the polymerizing and curing is preferably less than 10 seconds, more preferably less than 5 seconds, particularly preferably less than 3 seconds, and most preferably less than 2 seconds. In the continuous method, the irradiation is performed continuously, and polymerizing and curing reaction time is determined considering the speed of the ion exchange membrane forming composition moving through the irradiation beam.

Active radiation rays are preferably ultraviolet rays. The irradiation wavelength is preferably a wavelength that matches with the absorption wavelength of an arbitrary photopolymerization initiator included in the ion exchange membrane forming composition, and examples thereof include UV-A (400 nm to 320 nm), UV-B (320 nm to 280 nm), and UV-C (280 nm to 200 nm).

In the case where ultraviolet light RAT light) having high strength is used in the polymerizing and curing reaction, a considerable amount of heat is generated, and thus it is preferable to cool a lamp of the light source and/or the support/membrane with the air for cooling, in order to prevent the overheat. In the case of irradiation with the considerable light amount of infrared light (IR light) together with UV beams, the irradiation is performed with UV light by using an IR reflective quartz plate as a filter.

The ultraviolet light source is a mercury arc lamp, a carbon arc lamp, a low pressure mercury lamp, a medium pressure mercury lamp, a high pressure mercury lamp, a swirl-flow plasma arc lamp, a metal halide lamp, a xenon lamp, a tungsten lamp, a halogen lamp, laser, and an ultraviolet light-emitting diode. Ultraviolet light emitting lamps of the medium or high pressure mercury vapor type is particularly preferable. In addition, in order to modify an emission spectrum of the lamp, an additive such as metal halide may exist. A lamp having maximum light emission in a range of 200 nm to 450 nm is particularly appropriate.

The energy output of the irradiation source is preferably from 20 W/cm to 1,000 W/cm and more preferably from 40 W/cm to 500 W/cm. If the desired exposure dose can be realized, the energy output can be higher or lower than the range above. The curing of the membrane can be adjusted according to the desired exposure. The exposure dose is measured by High Energy UV Radiometer (UV Power Puck™ manufactured by EIT-Instrument Markets) in the UV-A range indicated in this device, and is preferably 40 mJ/cm$^2$ or greater, more preferably 100 mJ/cm$^2$ to 3,000 mJ/cm$^2$, and most preferably 150 mJ/cm$^2$ to 1,500 mJ/cm$^2$. The exposure time can be freely chosen, but is preferably shorter and most preferably less than 2 seconds.

In the case where the coating speed is high, plural light sources may be used in order to reach a desired dose. In this case, exposure strengths of these plural light sources may be equal to or different from each other.

[Polymerizing and Curing by Heating]

The heating temperature is preferably 40° C. to 120° C., more preferably 50° C. to 100° C., and even more preferably 60° C. to 90° C.

The heating time is preferably 1 minute to 72 hours, more preferably 1 minute to 24 hours, and even more preferably 1 minute to 4 hours.

<<Use of Ion Exchange Membrane>>

The ion exchange membrane according to the invention can be used in electrodeionization, continuous electrodeionization, electrodialysis, and electrodialysis reversal. The ion exchange membrane can be not only for general usage but also for medical use, and recently the ion exchange membrane has also used in a solid polymer electrolyte-type fuel cell.

EXAMPLES

Hereinafter, the invention is described in more detail with reference to examples, but the invention is not limited to these examples. Unless described otherwise, "part(s)" and "percent (%)" are on a mass basis.

Example 1

(Manufacturing of Anion Exchange Membrane by Photopolymerizing and Curing Reaction 1) Manufacturing of Anion Exchange Membrane Each coating liquid of the ion exchange membrane forming compositions in the compositions (unit: g) of Table 1 below was used and manually applied to an aluminum plate at a speed of about 5 m/min, by using a wire bar of 150 μm (a stainless steel rod obtained by winding a wire of 150 μm by 1 cycle/3 cm (length direction)), and subsequently the coating liquid was impregnated to nonwoven fiber (manufactured by Freudenberg Group, Product Name: FO-2223-10, thickness: 100 μm). The remaining coating liquid was removed by using a rod to which a wire was not wound. The temperature of the coating liquid at the time of application was about 50° C. The polymerizing and curing reaction was performed on the coating liquid impregnated support for the exposure time of 0.7 seconds and the polymerizing and curing time of 1.2 seconds by using an UV exposure machine (manufactured by Fusion UV Systems, Product Name: Light Hammer LH6, D-BULB, speed: 10 m/min, 100% intensity), and thus the anion exchanging membranes were prepared. Each of the obtained membranes was removed from the aluminum plate and was maintained for at least 12 hours in a 0.1 M NaCl solution.

In this manner, anion exchange membranes AEM1 to AEM10 according to the invention and the comparative anion exchange membranes cAEM1 to cAEM4 were manufactured.

2) Evaluation of Ion Exchange Membrane

With respect to the obtained ion exchange membranes, performances below were evaluated.

(i) Hydrophobicity Index H

In the method described above, log P of the monomer for forming the ion exchange resin and the material fixed to the resin was obtained by calculation, and the hydrophobicity index H was obtained by the expression below.

Hydrophobicity index $H=\Sigma\{(\log P$ of each component)$\times$(molar ratio of each material in resin)$\}$ (ii) Crosslinking Density CD (mmol/g)

Crosslinking density CD was obtained by the method described in page 14 of WO2013/011272A.

(iii) Measuring of Moisture Content (%)

A moisture content was calculated with the expression below by measuring the mass ($W_s$) of the membrane immersed. in a 0.5 M NaCl aqueous solution for 12 hours or greater and the mass ($W_i$) of the dried membrane (dry membrane).

As the moisture content (%) was lower, the moisture content was more preferable.

Moisture content=$(W_s-W_i)/W_i \times 100\%$ (iv) Measuring of Ion Exchange Capacity (meq/g)

Ion exchange capacity was measured in conformity with methods disclosed in page 194, Experimental method in membrane science written by Nakagaki Masayuki issued by Kitami Shobo Co., Ltd. (1984) (ISBN-978-4-906126-09-5).

However, instead of the mass of the dry membrane, the mass of the ion exchange resin (dry mass-support mass) was used.

(v) Measuring of water permeability WP ($\times 10^{-5}$ mL/m$^2$/Pa/hr)

Water permeability of the membrane was measured using a device having a flow channel 10 shown in FIG. 1. In FIG. 1, reference numeral 1 represents a membrane, and reference numerals 3 and 4 represent flow channels of a feed solution (pure water) and a draw solution (3 M NaCl), respectively. An arrow of reference numeral 2 shows a flow of water separated from the feed solution.

400 mL of feed solution and 400 mL of draw solution were brought into contact (membrane contact area of 18 cm$^2$) through the membrane, and each solution was allowed to flow at a flow rate of 0.11 cm/sec in a direction of an arrow of a reference numeral 5 using a Perista pump. A rate at which water in the feed solution permeates into the draw solution through the membrane was analyzed by measuring masses of the feed solution and the draw solution on a real time basis so as to obtain the water permeability.

As the water permeability WP is lower, the water permeability WP is more preferable. The values described in the tables are values obtained by multiplying the water permeability WP ($\times 10^{-5}$ mL/m$^2$/Pa/hr) by $10^5$.

(vi) Measuring of Electrical Resistance ER ($\Omega \cdot$cm$^2$) of Membrane

Both surfaces of the membrane immersed in a 0.5 M NaCl aqueous solution for about two hours were wiped with dry paper, and pinched in a double chamber-type cell (Active membrane area: 1 cm$^2$, a Ag/AgCl reference electrode was used in an electrode (manufactured by Metrohm AG)). Both chambers were filled with 100 mL of the NaCl aqueous solution in the same concentration, was placed in a thermostatic water tank at 25° C., and was allowed to stand until the cell reached equilibrium. After the temperature of the liquid in the cell exactly reached 25° C., electrical resistance $r_1$ was measured using an alternative current bridge (frequency: 1,000 Hz). Next, the membrane was removed, electrical resistance $r_2$ between both electrodes was measured only with a 0.5 M NaCl aqueous solution, and electrical resistance r of the membrane was calculated as $r_1$-$r_2$. This was set to be electrical resistance ER of the membrane.

As the electrical resistance ER of the membrane is lower, the electrical resistance ER was more preferable.

In the tables, values are presented as 1/ER which is an inverse number of the electrical resistance ER of the membrane. As the conductance (1/ER) which is the flow easiness of the current is greater, the conductance is more preferable.

Water permeability WP$\times$ electrical resistance ER of the membrane was calculated.

As the value thereof is lower, the value is more preferable.

The obtained results were summarized and presented in Table 1

The materials presented in Table 1 are compounds below.

Cation monomer

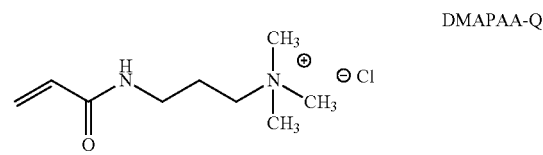

DMAPAA-Q

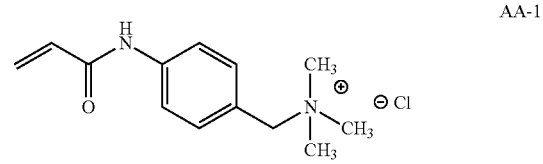

AA-1

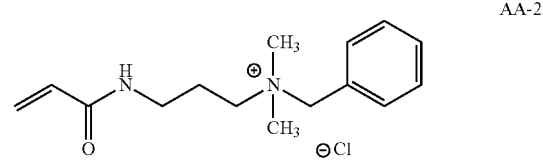

AA-2

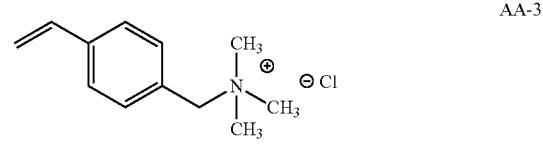

AA-3

Cation crosslinking agent
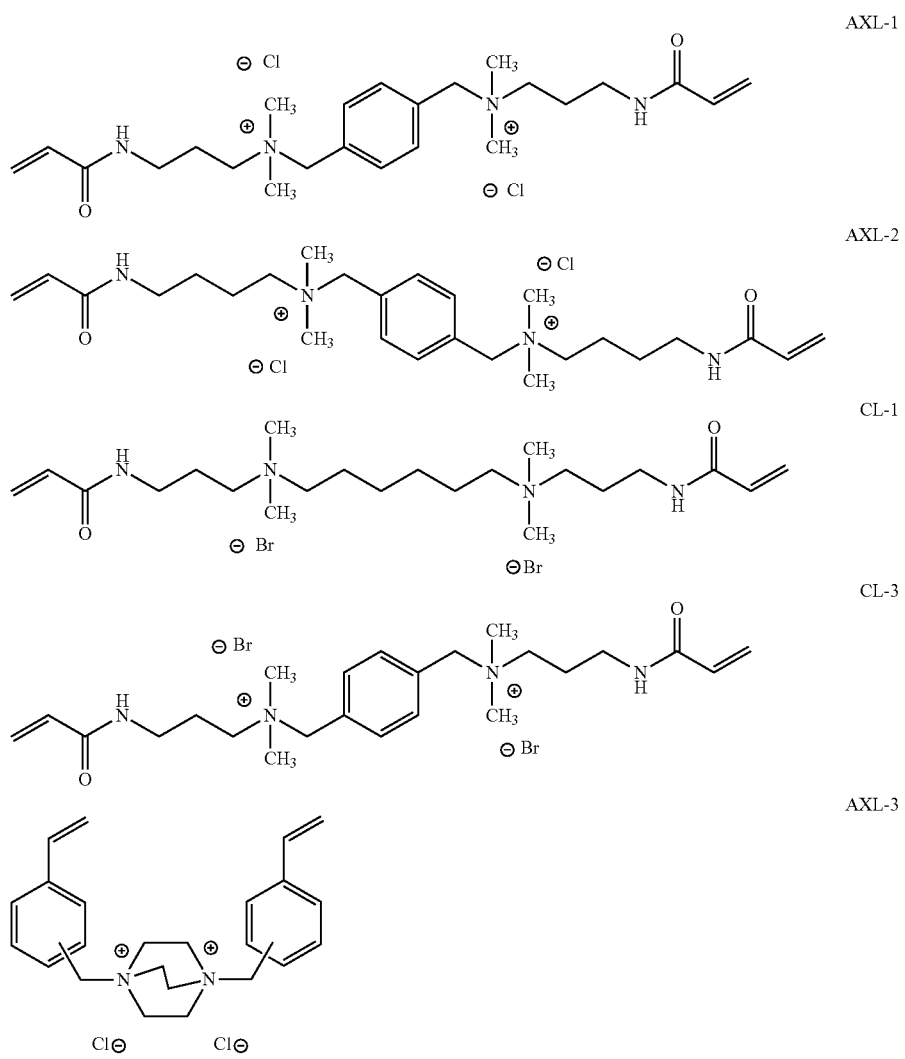
Photopolymerization initiator
Darocur 1173
Polymerization inhibitor
MEHQ
TABLE 1
| Classification | Type | Valence | Cross-linking point | M.W. | Membrane number log P | AEM1 Present invention | AEM2 Present invention | AEM3 Present invention | AEM4 Present invention | AEM5 Present invention | AEM6 Present invention |
|---|---|---|---|---|---|---|---|---|---|---|---|
| Cation monomer | DMAPAA-Q | 1 | 0 | 206.71 | 0.07 | 8 | | | | | |
| | AA-1 | 1 | 0 | 254.76 | 1.57 | | 15 | | | | |
| | AA-2 | 1 | 0 | 282.81 | 1.8 | | | 25 | | | |
| | AA-3 | 1 | 0 | 211.73 | 2.61 | | | | 10.5 | 30 | 18 |

TABLE 1-continued

| Classification | Type | Valence | Crosslinking point | M.W. | log P | | | | | | |
|---|---|---|---|---|---|---|---|---|---|---|---|
| Cation crosslinking agent | AXL-1 | 2 | 1 | 487.51 | 1.57 | | | | | 57 | 37.5 |
| | AXL-2 | 2 | 1 | 515.56 | 2.47 | 59.5 | 52.5 | 42.5 | | | |
| | CL-1 | 2 | 1 | 556.42 | 1.28 | | | | | | |
| | CL-3 | 2 | 1 | 576.41 | 1.57 | | | | | | |
| | AXL-3 | 2 | 1 | 417.41 | 5.65 | | | | | | 49.5 |
| Solvent | Water | | | | | 32 | 32 | 32 | 32 | 32 | 32 |
| Polymerization inhibitor | MEHQ | | | 124.14 | 1.52 | 0.04 | 0.04 | 0.04 | 0.04 | 0.04 | 0.04 |
| Photopolymerization initiator | Darocur 1173 | | | 164.2 | 1.53 | 0.46 | 0.46 | 0.46 | 0.46 | 0.46 | 0.46 |
| | Total parts by mass | | | | | 100 | 100 | 100 | 100 | 100 | 100 |
| | Solid content concentration | | | | | 68.0% | 68.0% | 68.0% | 68.0% | 68.0% | 68.0% |
| | Hydrophobicity index H | | | | | 1.86 | 2.13 | 2.11 | 1.87 | 2.23 | 4.34 |
| | Crosslinking density | | | | | 1.70 | 1.50 | 1.21 | 1.72 | 1.13 | 1.74 |
| | Moisture content | | | | | 42% | 40% | 44% | 46% | 49% | 48% |
| | Ion exchange capacity | | | | | 3.96 | 3.86 | 3.72 | 4.17 | 4.35 | 4.74 |
| | Water permeability WP | | | | | 4.13 | 4.01 | 4.31 | 5.12 | 7.74 | 5.50 |
| | Conductance 1/ER | | | | | 0.42 | 0.41 | 0.40 | 0.49 | 0.67 | 0.68 |
| | ER × WP | | | | | 9.8 | 9.8 | 10.8 | 10.5 | 11.6 | 8.1 |

| Classification | Type | Valence | Crosslinking point | M.W. | Membrane number log P | AEM7 Present invention | AEM8 Present invention | AEM9 Present invention | AEM10 Present invention | cAEM1 Comparative Example |
|---|---|---|---|---|---|---|---|---|---|---|
| Cation monomer | DMAPAA-Q | 1 | 0 | 206.71 | 0.07 | | 9.7 | | | 7.4 |
| | AA-1 | 1 | 0 | 254.76 | 1.57 | | | | | |
| | AA-2 | 1 | 0 | 282.81 | 1.8 | | | | | |
| | AA-3 | 1 | 0 | 211.73 | 2.61 | 35 | | 11.6 | 20.3 | |
| Cation crosslinking agent | AXL-1 | 2 | 1 | 487.51 | 1.57 | | | 52.84 | | |
| | AXL-2 | 2 | 1 | 515.56 | 2.47 | | 54.74 | | | |
| | CL-1 | 2 | 1 | 556.42 | 1.28 | | | | | 60 |
| | CL-3 | 2 | 1 | 576.41 | 1.57 | | | | | |
| | AXL-3 | 2 | 1 | 417.41 | 5.65 | 32.5 | | | 44.14 | |
| Solvent | Water | | | | | 32 | 35 | 35 | 35 | 32.1 |
| Polymerization inhibitor | MEHQ | | | 124.14 | 1.52 | 0.04 | 0.04 | 0.04 | 0.04 | 0.05 |
| Photopolymerization initiator | Darocur 1173 | | | 164.2 | 1.53 | 0.46 | 0.52 | 0.52 | 0.52 | 0.45 |
| | Total parts by mass | | | | | 100 | 100 | 100 | 100 | 100 |
| | Solid content concentration | | | | | 68.0% | 65.0% | 65.0% | 65.0% | 67.9% |
| | Hydrophobicity index H | | | | | 3.56 | 1.73 | 1.91 | 4.16 | 0.99 |
| | Crosslinking density | | | | | 1.15 | 1.63 | 1.67 | 1.63 | 1.85 |
| | Moisture content | | | | | 55% | 36% | 41% | 43% | 59% |
| | Ion exchange capacity | | | | | 4.72 | 3.99 | 4.18 | 4.73 | 4.30 |
| | Water permeability WP | | | | | 8.30 | 4.62 | 5.32 | 6.05 | 8.50 |
| | Conductance 1/ER | | | | | 0.93 | 0.44 | 0.50 | 0.71 | 0.56 |
| | ER × WP | | | | | 8.9 | 10.5 | 10.7 | 8.5 | 15.2 |

| Classification | Type | Valence | Crosslinking point | M.W. | Membrane number log P | cAEM2 Comparative Example | cAEM3 Comparative Example | cAEM4 Comparative Example |
|---|---|---|---|---|---|---|---|---|
| Cation monomer | DMAPAA-Q | 1 | 0 | 206.71 | 0.07 | 0 | 7.2 | 0 |
| | AA-1 | 1 | 0 | 254.76 | 1.57 | | | |
| | AA-2 | 1 | 0 | 282.81 | 1.8 | | | |
| | AA-3 | 1 | 0 | 211.73 | 2.61 | | | |

TABLE 1-continued

| | | | | | | | | |
|---|---|---|---|---|---|---|---|---|
| Cation crosslinking agent | AXL-1 | 2 | 1 | 487.51 | 1.57 | | | |
| | AXL-2 | 2 | 1 | 515.56 | 2.47 | | | |
| | CL-1 | 2 | 1 | 556.42 | 1.28 | 67.5 | | |
| | CL-3 | 2 | 1 | 576.41 | 1.57 | | 60.4 | 67.5 |
| | AXL-3 | 2 | 1 | 417.41 | 5.65 | | | |
| Solvent | Water | | | | | 32 | 31.9 | 32 |
| Polymerization inhibitor | MEHQ | | | 124.14 | 1.52 | 0.05 | 0.05 | 0.05 |
| Photopolymerization initiator | Darocur 1173 | | | 164.2 | 1.53 | 0.45 | 0.45 | 0.45 |
| | | | | Total parts by mass | | 100 | 100 | 100 |
| | | | | Solid content concentration | | 68.0% | 68.1% | 68.0% |
| | | | | Hydrophobicity index H | | 1.29 | 1.20 | 1.57 |
| | | | | Crosslinking density | | 2.12 | 1.78 | 2.03 |
| | | | | Moisture content | | 55% | 49% | 46% |
| | | | | Ion exchange capacity | | 4.23 | 4.16 | 4.07 |
| | | | | Water permeability WP | | 7.00 | 6.80 | 6.10 |
| | | | | Conductance 1/ER | | 0.48 | 0.45 | 0.42 |
| | | | | ER × WP | | 14.6 | 15.1 | 14.5 |

As clearly presented in Table 1, with respect to all of the anion exchange membranes AEM1 to AEM10 according to the invention of which hydrophobicity indexes H were 1.6 or greater, products (ER×WP) were the electrical resistance of the membrane and the water permeability were as low as 8.1 to 11.6, and low electrical resistance and low water permeability were able to be achieved. Accordingly, it was possible to cause the ion exchange capacity to he high and the moisture content to be low.

In contrast, with respect to cAEM1 to cAEM4 in the comparative examples, of which hydrophobicity indexes H were less than 1.6, products (ER×WP) of the electrical resistance of the membrane and the water permeability were as high as 14.5 to 15.2, and low electrical resistance and low water permeability were not achieved.

For example, the membranes according to the invention had low water permeability, even if electrical resistance thereof was in the same level as that of the membranes in the comparative examples and had low electrical resistance (conductance was high), even if water permeability thereof was in the same level as that of the membranes in the comparative examples.

Example 2

(Manufacturing of Anion Exchange Membrane by Thermal Polymerizing and Curing Reaction 1) Manufacturing of Anion Exchange Membrane Each coating liquid of the ion exchange membrane forming compositions in the compositions (unit: g) of Table 2 below was used and manually applied to an aluminum plate at a speed of about 5 m/min, by using a wire bar of 150 μm (a stainless steel rod obtained by winding a wire of 150 μm by 1 cycle/3 cm (length direction)), and subsequently the coating liquid was impregnated to nonwoven fiber (manufactured by Freudenberg Group, Product Name: FO-2223-10, thickness: 100 μm). The remaining coating liquid was removed by using a rod to which a wire was not wound. The temperature of the coating liquid at the time of application was about 50° C. Both sides of the support was interposed between polyethylene terephthalate films and heated at 80° C. for 4 hours, and anion exchange membranes were manufactured by performing polymerizing and curing reaction. Each of the obtained membranes was removed from the aluminum plate and was maintained for at least 12 hours in a 0.1 M NaCl solution.

In this manner, anion exchange membranes AEM11 to AEM16 according to the invention and a comparative anion exchange membrane cAEM5 were manufactured.

2) Evaluation of Ion Exchange Membrane

With respect to the obtained ion exchange membranes, the same evaluations were performed in the same manner as Example 1.

Obtained results were collected and presented in Table 2 below.

As the thermal polymerization initiator, a compound below was used.

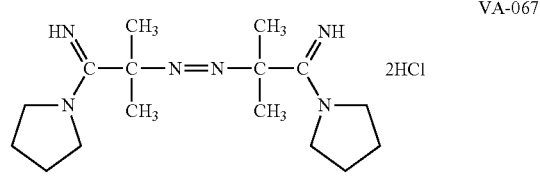 [SMILES: CC(C)(N=NC(C)(C)C(=N)N1CCCC1)C(=N)N1CCCC1]

TABLE 2

| Classification | Type | Valence | Cross-linking point | M.W. | Membrane number log P | AEM11 Present invention | AEM12 Present invention | AEM13 Present invention | AEM14 Present invention | AEM15 Present invention | AEM16 Present invention | cAEM5 Comparative Example |
|---|---|---|---|---|---|---|---|---|---|---|---|---|
| Cation monomer | DMAPAA-Q | 1 | 0 | 206.71 | 0.07 | 9.5 | | | 9.4 | | | 6 |
| | AA-3 | 1 | 0 | 211.73 | 2.61 | | 11.3 | 20 | | 11.4 | 19.5 | |
| Cation crosslinking agent | AXL-1 | 2 | 1 | 487.51 | 1.57 | | 55.6 | | | 52.5 | | |
| | AXL-2 | 2 | 1 | 515.56 | 2.47 | 57.4 | | | 54.5 | | | |
| | CL-1 | 2 | 1 | 556.42 | 1.28 | | | | | | | 60.75 |
| | AXL-3 | 2 | 1 | 417.41 | 5.65 | | | 46.9 | | | 44.4 | |
| Solvent | Water | | | | | 32 | 32 | 32 | 35 | 35 | 35 | 32.1 |
| Polymerization inhibitor | MEHQ | | | 124.14 | 1.52 | 0.04 | 0.04 | 0.04 | 0.04 | 0.04 | 0.04 | 0.05 |
| Photopolymerization initiator | VA-067 | | | 379.37 | 3.04 | 1.1 | 1.1 | 1.1 | 1.1 | 1.1 | 1.1 | 1.1 |
| | Total parts by mass | | | | | 100.04 | 100.04 | 100.04 | 100.04 | 100.04 | 100.04 | 100 |
| | Solid content concentration | | | | | 68.0% | 68.0% | 68.0% | 65.0% | 65.0% | 65.0% | 67.9% |
| | Hydrophobicity index H | | | | | 1.79 | 1.92 | 4.24 | 1.77 | 1.94 | 4.22 | 1.07 |
| | Crosslinking density | | | | | 1.64 | 1.68 | 1.65 | 1.63 | 1.66 | 1.64 | 1.87 |
| | Moisture content | | | | | 38% | 42% | 42% | 41% | 44% | 48% | 62% |
| | Ion exchange capacity | | | | | 3.95 | 4.14 | 4.69 | 3.95 | 4.14 | 4.69 | 4.24 |
| | Water permeability WP | | | | | 4.34 | 5.06 | 5.68 | 4.40 | 5.13 | 5.73 | 8.50 |
| | Conductance 1/ER | | | | | 0.43 | 0.48 | 0.67 | 0.43 | 0.48 | 0.68 | 0.56 |
| | ER × WP | | | | | 10.2 | 10.5 | 8.4 | 10.3 | 10.6 | 8.5 | 15.2 |

As clearly presented in Table 2, in the case where the ion exchange membranes were manufactured by thermal polymerizing and curing reaction, in the same manner as in Example 1, with respect to all of the anion exchange membranes AEM11 to AEM16 according to the invention of which hydrophobicity indexes H were 1.6 or greater, products (ER×WP) were the electrical resistance of the membrane and the water permeability were as low as 8.4 to 10.6, and low electrical resistance and low water permeability were able to be achieved. Accordingly, it was possible to cause the ion exchange capacity to be high and the moisture content to be low.

In contrast, with respect to cAEM5 in the comparative example, of which a hydrophobicity index H was less than 1.6, products (ER×WP) of the electrical resistance of the membrane and the water permeability were as high as 15.2, and low electrical resistance and low water permeability were not achieved.

For example, the membranes according to the invention had low water permeability, even if electrical resistance thereof was in the same level as that of the membrane in the comparative example.

Example 3

(Manufacturing of Cation Exchange Membrane by Photopolymerizing and Curing Reaction) 1) Manufacturing of Cation Exchange Membrane Each coating liquid of the ion exchange membrane forming compositions in the compositions (unit: g) of Table 3 below was used and manually applied to an aluminum plate at a speed of about 5 m/min, by using a wire bar of 150 μm (a stainless steel rod obtained by winding a wire of 150 μm by 1 cycle/3 cm (length direction)), and subsequently the coating liquid was impregnated to nonwoven fiber (manufactured by Freudenberg Group, Product Name: FO-2223-10, thickness: 100 μm). The remaining coating liquid was removed by using a rod to which a wire was not wound. The temperature of the coating liquid at the time of application was about 50° C. The polymerizing and curing reaction was performed on the coating liquid impregnated support for the exposure time of 1.0 second and the polymerizing and curing time of 1.6 seconds, by using an UV exposure machine (manufactured by Fusion UV Systems, Product Name: Light Hammer LH6, D-BULB, speed: 8 m/min, 100% intensity), and thus the cation exchanging membranes was prepared. Each of the obtained membranes was removed from the aluminum plate and was maintained for at least 12 hours in a 0.1 M NaCl solution.

In this manner, cation exchange membranes CEM1 to CEM10 according to the invention and comparative cation exchange membranes cCEM1 to cCEM3 were manufactured.

2) Evaluation of Ion Exchange Membrane

With respect to the obtained ion exchange membranes, the same evaluations were performed in the same manner as Example 1.

Obtained results were collected and presented in Table 3 below.

Among the materials presented in Table 3 below, the anion monomer and the anion crosslinking agent were compounds below.

Anion monomer

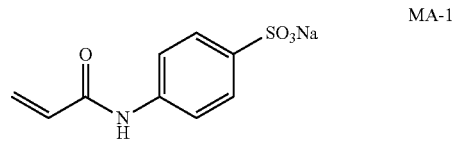

MA-1

MA-10

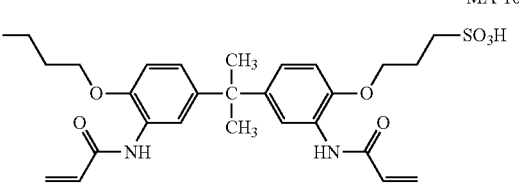

VB—SO$_3$Na

Anion crosslinking agent

MA-21

MA-11

MA-15

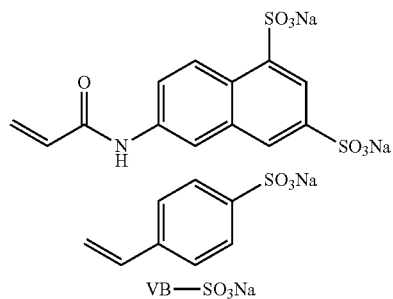

MA-16

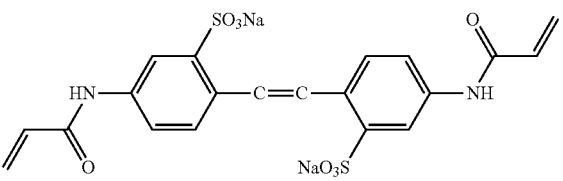

MA-17

In Table 3 below, a neutral crosslinking agent below and a new polymerization inhibitor below were used.

Neutral crosslinking agent

MBA

Polymerization inhibitor
Genorad 16: Product name, manufactured by Rahn AG
The solvent IPA presented in Table 3 represents isopropanol.

TABLE 3

| Classification | Type | Valence | Cross-linking point | M.W. | Membrane number log P | CEM1 Present invention | CEM2 Present invention | CEM3 Present invention | CEM4 Present invention | CEM5 Present invention | CEM6 Present invention | CEM7 Present invention |
|---|---|---|---|---|---|---|---|---|---|---|---|---|
| Anion monomer | MA-1 | 1 | 0 | 249.22 | 0.78 | | | | | | | |
| | MA-10 | 2 | 0 | 357.36 | 0.94 | 23 | 17 | 14 | 5 | | | |
| | VB-SO$_3$Na | 1 | 0 | 206.19 | 1.83 | | | | | 23 | 30 | 35.7 |
| Anion crosslinking agent | MA-11 | 2 | 1 | 496.42 | 1.21 | | | | | | 37.5 | |
| | MA-15 | 2 | 1 | 636.65 | 4.28 | 44.5 | 50.5 | | | 44.5 | | |
| | MA-16 | 2 | 1 | 610.7 | 1.94 | | | 53.5 | | | | |
| | MA-17 | 2 | 1 | 522.46 | 1.72 | | | | 62.5 | | | |
| | MA-21 | 1 | 1 | 232.23 | 2.46 | | | | | | | 31.8 |
| Neutral crosslinking agent | MBA | 0 | 1 | 154.17 | −0.04 | | | | | | | |
| Solvent | Water | | | | | 32 | 32 | 32 | 32 | 32 | 32 | 32 |
| | IPA | | | | | | | | | | | |
| Polymerization inhibitor | MEHQ | | | 124.14 | 1.52 | 0.04 | 0.04 | 0.04 | 0.04 | 0.04 | 0.04 | 0.04 |
| | Genorad 16 | | | 276.86 | 3.71 | | | | | | | |
| Photopolymerization initiator | Darocur 1173 | | | 164.2 | 1.53 | 0.46 | 0.46 | 0.46 | 0.46 | 0.46 | 0.46 | 0.46 |
| | | | | Total parts by mass | | 100 | 100 | 100 | 100 | 100 | 100 | 100 |
| | | | | Solid content concentration | | 68.0% | 68.0% | 68.0% | 68.0% | 68.0% | 68.0% | 68.0% |
| | | | | Hydrophobicity index H | | 2.65 | 2.99 | 1.63 | 1.64 | 2.75 | 1.62 | 2.10 |
| | | | | Crosslinking density | | 1.03 | 1.17 | 1.29 | 1.76 | 1.03 | 1.11 | 2.01 |

TABLE 3-continued

|  |  |  |  |  |  |  |  |  |  |  |  |
|---|---|---|---|---|---|---|---|---|---|---|---|
|  |  |  |  | Moisture content | 40% | 32% | 41% | 35% | 32% | 57% | 43% |
|  |  |  |  | Ion exchange capacity | 3.95 | 3.73 | 3.73 | 3.93 | 3.70 | 4.36 | 4.56 |
|  |  |  |  | Water permeability WP | 5.57 | 3.60 | 4.56 | 3.97 | 4.14 | 8.53 | 5.93 |
|  |  |  |  | Conductance 1/ER | 0.47 | 0.39 | 0.40 | 0.41 | 0.40 | 0.72 | 0.62 |
|  |  |  |  | ER × WP | 11.8 | 9.3 | 11.3 | 9.6 | 10.4 | 11.8 | 9.6 |

| Classification | Type | Valence | Cross-linking point | M.W. | Membrane number log P | CEM8 Present invention | CEM9 Present invention | CEM10 Present invention | cCEM1 Comparative Example | cCEM2 Comparative Example | cCEM3 Comparative Example |
|---|---|---|---|---|---|---|---|---|---|---|---|
| Anion monomer | MA-1 | 1 | 0 | 249.22 | 0.78 |  |  |  |  | 16.04 |  |
|  | MA-10 | 2 | 0 | 357.36 | 0.94 | 18.2 |  |  | 50.3 |  |  |
|  | VB-SO$_3$Na | 1 | 0 | 206.19 | 1.83 |  | 31.7 | 33.7 |  |  | 50.3 |
| Anion crosslinking agent | MA-11 | 2 | 1 | 496.42 | 1.21 |  | 32.74 |  |  | 18 |  |
|  | MA-15 | 2 | 1 | 636.65 | 4.28 | 46.24 |  |  |  |  |  |
|  | MA-16 | 2 | 1 | 610.7 | 1.94 |  |  |  |  |  |  |
|  | MA-17 | 2 | 1 | 522.46 | 1.72 |  |  |  |  |  |  |
|  | MA-21 | 1 | 1 | 232.23 | 2.46 |  |  | 30.74 |  |  |  |
| Neutral crosslinking agent | MBA | 0 | 1 | 154.17 | −0.04 |  |  |  | 12 |  | 12 |
| Solvent | Water |  |  |  |  | 35 | 35 | 35 | 12.5 | 12.5 | 12.5 |
|  | IPA |  |  |  |  |  |  |  | 18 | 18 | 18 |
| Polymerization inhibitor | MEHQ |  |  | 124.14 | 1.52 | 0.04 | 0.04 | 0.04 |  |  |  |
|  | Genorad 16 |  |  | 276.86 | 3.71 |  |  |  | 0.5 | 0.5 | 0.5 |
| Photopolymerization initiator | Darocur 1173 |  |  | 164.2 | 1.53 | 0.52 | 0.52 | 0.52 | 0.5 | 0.5 | 0 5 |
|  |  |  |  | Total parts by mass | | 100 | 100 | 100 | 93.8 | 65.54 | 93.8 |
|  |  |  |  | Solid content concentration | | 65.0% | 65.0% | 65.0% | 67.5% | 53.5% | 67.5% |
|  |  |  |  | Hydrophobicity index H | | 2.87 | 1.64 | 2.11 | 0.63 | 1.00 | 1.39 |
|  |  |  |  | Crosslinking density | | 1.12 | 1.01 | 2.04 | 1.23 | 1.03 | 1.23 |
|  |  |  |  | Moisture content | | 37% | 60% | 40% | 37% | 38% | 75% |
|  |  |  |  | Ion exchange capacity | | 3.80 | 4.39 | 4.55 | 4.45 | 3.91 | 3.85 |
|  |  |  |  | Water permeability WP | | 4.27 | 9.01 | 5.80 | 3.70 | 3.50 | 19.10 |
|  |  |  |  | Conductance 1/ER | | 0.41 | 0.78 | 0.61 | 0.27 | 0.25 | 0.10 |
|  |  |  |  | ER × WP | | 10.3 | 11.5 | 9.6 | 13.7 | 14.0 | 191.0 |

As clearly presented in Table 3, also in the case of the cation exchange membrane, in the same manner as in the anion membranes of Example 1 manufactured in the photopolymerizing and curing reaction, with respect to all of the cation exchange membrane CEM1 to CEM10 according to the invention of which hydrophobicity indexes H were 1.6 or greater, products (ER×WP) were the electrical resistance of the membrane and the water permeability were as low as 9.3 to 11.8, and low electrical resistance and low water permeability were able to be achieved. Accordingly, it was possible to cause the ion exchange capacity to be high and the moisture content to be low.

In contrast, with respect to cCEM1 to cCEM3 in the comparative examples, of which hydrophobicity indexes El were less than 1.6, products (ER×WP) of the electrical resistance of the membrane and the water permeability were as high as 13.7 to 191.0, and low electrical resistance and low water permeability were not achieved.

For example, the membranes according to the invention had low electrical resistance (conductance was high), even if water permeability thereof was in the same level as that of the membranes in the comparative examples.

Example 4

(Manufacturing of Cation Exchange Membrane by Thermal Polymerizing and Curing Reaction) 1) Manufacturing of Cation Exchange Membrane Each coating liquid of the ion exchange membrane forming compositions in the compositions (unit: g) of Table 4 below was used and cation exchange membranes CEM11 to CEM16 according to the invention and a comparative cation exchange membrane cCEM4 were manufactured in the same manner as in Example 2.

2) Evaluation of Ion Exchange Membrane

With respect to the obtained ion exchange membranes, the same evaluations were performed in the same manner as Example 1.

Obtainable results were collected and presented in Table 4 below.

TABLE 4

| Classification | Type | Valence | Cross-linking point | M.W. | Membrane number log P | CEM11 Present invention | CEM12 Present invention | CEM13 Present invention | CEM14 Present invention | CEM15 Present invention | CEM16 Present invention | cCEM4 Comparative Example |
|---|---|---|---|---|---|---|---|---|---|---|---|---|
| Anion monomer | MA-1 | 1 | 0 | 249.22 | 0.78 |  |  |  |  |  |  | 15 |
|  | MA-10 | 2 | 0 | 357.36 | 0.94 | 18 |  |  | 17.8 |  |  |  |
|  | VB-SO$_2$Na | 1 | 0 | 206.19 | 1.83 |  | 31.5 | 34 |  | 31.2 | 34.3 |  |
| Anion crosslinking agent | MA-11 | 2 | 1 | 496.42 | 1.21 |  | 35.4 |  |  | 32.7 |  | 18 |
|  | MA-15 | 2 | 1 | 636.65 | 4.28 | 48.86 |  |  | 46.06 |  |  |  |
|  | MA-21 | 1 | 1 | 232.23 | 2.46 |  |  | 32.9 |  |  | 29.6 |  |

TABLE 4-continued

| Classification | Type | Valence | Cross-linking point | M.W. | Membrane number log P | CEM11 Present invention | CEM12 Present invention | CEM13 Present invention | CEM14 Present invention | CEM15 Present invention | CEM16 Present invention | cCEM4 Comparative Example |
|---|---|---|---|---|---|---|---|---|---|---|---|---|
| Solvent | Water | | | | | 32 | 32 | 32 | 35 | 35 | 35 | 12.5 |
| | IPA | | | | | | | | | | | 18 |
| Polymerization inhibitor | MEHQ | | | 124.14 | 1.52 | 0.04 | 0.04 | 0.04 | 0.04 | 0.04 | 0.04 | |
| | Genorad 16 | | | 276.86 | 3.71 | | | | | | | 0.5 |
| Photopolymerization initiator | VA-067 | | | 379.37 | 3.04 | 1.1 | 1.1 | 1.1 | 1.1 | 1.1 | 1.1 | 1.1 |
| | | | | Total parts by mass | | 100 | 100.04 | 100.04 | 100 | 100.04 | 100.04 | 65.1 |
| | | | | Solid content concentration | | 68.0% | 68.0% | 68.0% | 65.0% | 65.0% | 65.0% | 53.1% |
| | | | | Hydrophobicity index H | | 2.95 | 1.65 | 2.13 | 2.92 | 1.66 | 2.11 | 1.00 |
| | | | | Crosslinking density | | 1.13 | 1.05 | 2.08 | 1.11 | 1.01 | 1.96 | 1.05 |
| | | | | Moisture content | | 35% | 53% | 39% | 37% | 56% | 44% | 37% |
| | | | | Ion exchange capacity | | 3.74 | 4.34 | 4.51 | 3.76 | 4.35 | 4.52 | 3.84 |
| | | | | Water permeability WP | | 3.80 | 8.60 | 5.37 | 4.00 | 8.77 | 588 | 3.50 |
| | | | | Conductance 1/ER | | 0.39 | 0.72 | 0.57 | 0.40 | 0.74 | 0.60 | 0.25 |
| | | | | ER × WP | | 9.6 | 11.9 | 9.4 | 10.0 | 11.8 | 9.8 | 14.0 |

As clearly presented in Table 4, also in the case of the cation exchange membranes manufactured by thermal polymerizing and curing reaction, in the same manner as in the anion membranes of Example 2 manufactured by thermal polymerizing and curing reaction, with respect to all of the cation exchange membranes CEM11 to CEM16 according to the invention of which hydrophobicity indexes H were 1.6 or greater, products (ER×WP) were the electrical resistance of the membrane and the water permeability were as low as 9.4 to 11.9, and low electrical resistance and low water permeability were able to be achieved. Accordingly, it was possible to cause the ion exchange capacity to be high and the moisture content to be low.

In contrast, with respect to cCEM4 in the comparative example, of which hydrophobicity indexes H were less than 1.6, the product (ER×WP) of the electrical resistance of the membrane and the water permeability were as high as 14.0, and low electrical resistance and low water permeability were not achieved.

For example, the membranes according to the invention had low electrical resistance (conductance was high), even if water permeability thereof was in the same level as that of the membrane in the comparative example.

The invention was described in detail with reference to embodiments thereof, unless described otherwise, any details of the description according to the invention are not intended to limit the invention, and it is obvious that the invention is broadly construed without departing from the spirit and the scope of the invention described in the accompanying claims.

EXPLANATION OF REFERENCES

1: membrane

2: arrow indicating that water in teed solution penetrates draw solution through membrane

3: flow channel of feed solution

4: flow channel of draw solution

5: progress direction of liquid

10: flow channel water permeability measuring device

What is claimed is:

1. An ion exchange membrane obtained by using an ionic monomer having at least two or more polymerizable functional groups,
wherein a hydrophobicity index H obtained by an expression below from a monomer for forming an ion exchange resin in the ion exchange membrane and a material fixed to the resin is 1.6 or greater;

Hydrophobicity index $H = \mathrm{E}\Sigma\{(\log P \text{ of each component}) \times (\text{molar ratio of each material in resin})\}$.

2. The ion exchange membrane according to claim 1, wherein the ionic monomer includes quaternary ammonium.

3. The ion exchange membrane according to claim 1, wherein the ionic monomer includes a sulfonic acid group or a salt thereof.

4. The ion exchange membrane according to claim 1, wherein the ionic monomer includes an alkylamide group as the polymerizable functional group.

5. The ion exchange membrane according to claim 1, wherein the ionic monomer includes a styrene structure as the polymerizable functional group.

6. The ion exchange membrane according to claim 1 obtained by optically polymerizing and curing the ionic monomer.

7. The ion exchange membrane according to claim 1 obtained by thermally polymerizing and curing the ionic monomer.

8. The ion exchange membrane according to claim 1, obtained by polymerizing and curing a composition,
wherein a moisture content of the composition including the ionic monomer is 35 mass % or less.

9. A method for manufacturing an ion exchange membrane, by using an ionic monomer having at least two or more polymerizable functional groups, comprising:
polymerizing and curing a monomer for forming an ion exchange resin in the ion exchange membrane and a material fixed to the resin such that a hydrophobicity index H obtained by an expression below is 1.6 or greater;

Hydrophobicity index $H = \Sigma\mathrm{E}\{(\log P \text{ of each component}) \times (\text{molar ratio of each material in resin})\}$.

10. The method for manufacturing an ion exchange membrane according to claim 9, comprising:
   optically polymerizing and curing the ionic monomer.

11. The method for manufacturing an ion exchange membrane according to claim 9, comprising:
   thermally polymerizing and curing the ionic monomer.

12. The method for manufacturing an ion exchange membrane according to claim 9, comprising:
   polymerizing and curing a composition,
   wherein a moisture content of the composition including the ionic monomer is 35 mass % or less.

* * * * *